(12) United States Patent
Butler et al.

(10) Patent No.: US 9,442,260 B2
(45) Date of Patent: Sep. 13, 2016

(54) INTERPOSER HAVING OPTICAL INTERFACE WITH ALIGNMENT STRUCTURES FORMED BY A RESIST LAYER OF INTERPOSER AND RELATED OPTIC ASSEMBLIES

(71) Applicant: CORNING OPTICAL COMMUNICATIONS LLC, Hickory, NC (US)

(72) Inventors: Douglas Llewellyn Butler, Painted Post, NY (US); Micah Colen Isenhour, Lincolnton, NC (US); Dennis Michael Knecht, Hickory, NC (US); James Phillip Luther, Hickory, NC (US); Karen Irene Matthews, Horseheads, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/296,849

(22) Filed: Jun. 5, 2014

(65) Prior Publication Data

US 2015/0003791 A1     Jan. 1, 2015

Related U.S. Application Data

(60) Provisional application No. 61/840,737, filed on Jun. 28, 2013.

(51) Int. Cl.
    *G02B 6/36*             (2006.01)
    *G02B 6/42*             (2006.01)

(52) U.S. Cl.
    CPC ............ *G02B 6/4249* (2013.01); *G02B 6/428* (2013.01); *G02B 6/4292* (2013.01)

(58) Field of Classification Search
    CPC .................. H01L 2924/00014; G02B 6/4292; G02B 6/4246; G02B 6/36
    USPC .................................... 385/53, 88, 89, 90, 91
    See application file for complete search history.

(56) References Cited

U.S. PATENT DOCUMENTS

| 2011/0315858 A1 | 12/2011 | Heck et al. ............... 250/214 A |
| 2014/0193123 A1* | 7/2014 | Bowen ................... G02B 6/425 385/93 |
| 2014/0219612 A1* | 8/2014 | Butler .................. G02B 6/3882 385/78 |

* cited by examiner

*Primary Examiner* — Jennifer Doan

(57) ABSTRACT

Disclosed are interposers and interposer structures having an optical interface for optical fiber connection with a related fiber optic ferrule that can form a portion of an optical assembly. The interposer is useful for transmitting optical signals to/from the interposer for high-speed communication. Specifically, the interposer provides a passively aligned structure with an optical alignment structure of the interposer formed by a resist layer of the interposer.

18 Claims, 17 Drawing Sheets

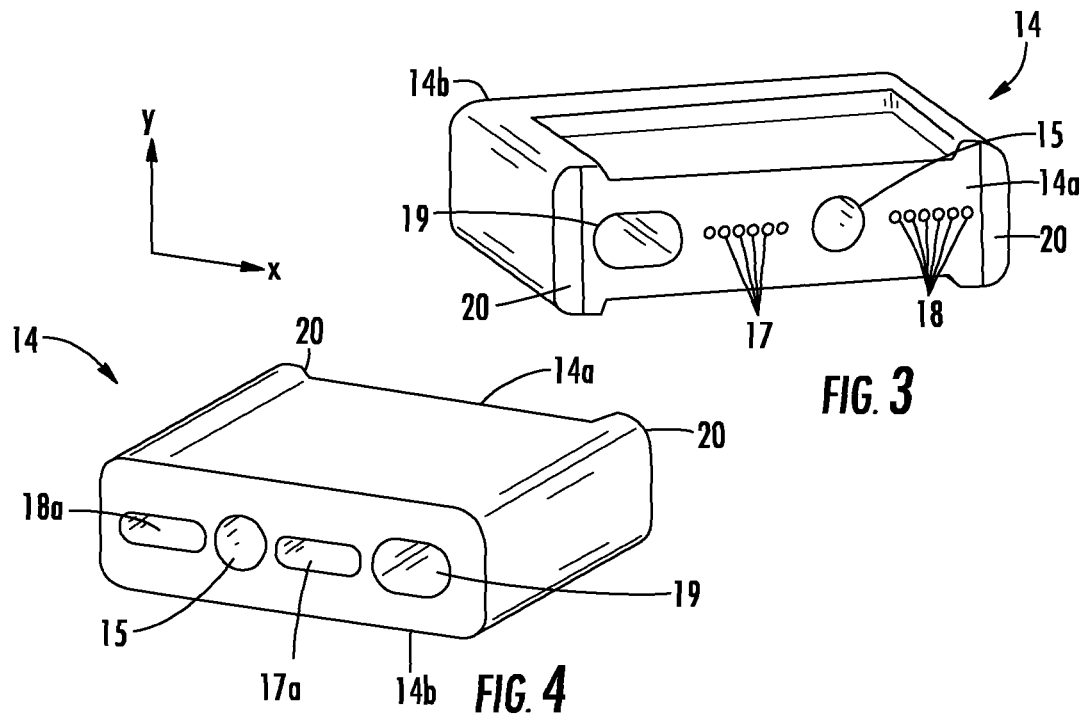
FIG. 3
FIG. 4
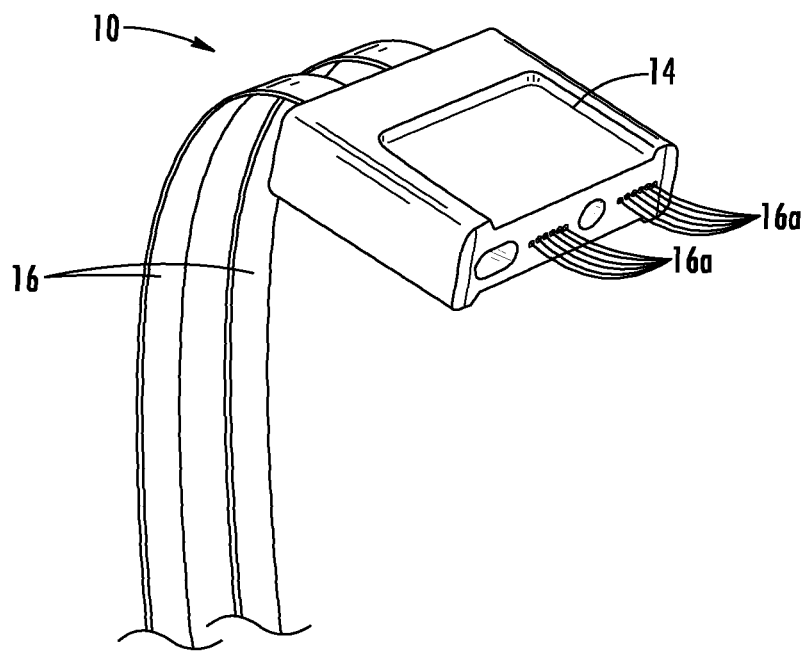
FIG. 5

INTERPOSER HAVING OPTICAL INTERFACE WITH ALIGNMENT STRUCTURES FORMED BY A RESIST LAYER OF INTERPOSER AND RELATED OPTIC ASSEMBLIES

PRIORITY APPLICATION

This application claims the benefit of priority under 35 U.S.C. §119 of U.S. Provisional Application Ser. No. 61/840,737, filed on Jun. 28, 2013, the content of which is relied upon and incorporated herein by reference in its entirety.

FIELD

The disclosure relates generally to an interposer(s) having an optical interface for making an optical connection with an optical assembly attached to the interposer along with interposer structures. Specifically, the interposer provides a passively aligned structure having an optical alignment structure formed in a resist layer of the interposer.

BACKGROUND

Optical fibers have displaced copper-based connectivity in much of the traditional long-haul and metro telecommunication networks for numerous reasons such as large bandwidth capacity, dielectric characteristics and the like. As higher network speeds for communication networks are required the optical fiber will move deeper into the communication networks toward the electronics located in servers and switches that manage traffic on the communication network. As this migration of optical fibers deeper into communication networks occurs new challenges will be encountered for making optical connections to the electronics. By way of example, aligning and maintain optical alignment of a plurality of optical fibers of an optical connection during operating conditions presents unresolved needs.

SUMMARY

The disclosure is directed to an interposer including a connector mounting surface, an optical alignment structure and an optical interface, the optical alignment structure being formed by a resist layer of the interposer, and the interposer being attached to the circuit board. In other embodiments, an optical assembly may be attached to any of the interposer disclosed for permitting optical communication. Further, the interposers disclosed may include any suitable material such as silicon. The interposers disclosed may be a portion of an interposer structure such as mounted to a circuit board or the like as disclosed herein.

The disclosure is also directed to an interposer having a connector mounting surface having a first pin and a second pin disposed in the connector mounting surface. The first pin and the second pin integrally formed as a portion of the interposer, wherein the interposer is attached to the circuit board.

The disclosure is also directed to methods of making an interposer. One method includes forming an interposer on a silicon material so it has a connector mounting surface with an optical interface, and forming an optical alignment feature in the interposer that is disposed adjacent to the connector mounting surface. One method may include forming the optical alignment feature in a resist layer of the interposer.

The disclosure is also directed to a method of making an interposer including forming an interposer on a silicon material so it has a connector mounting surface with an optical interface, and forming a first pin and a second pin in the interposer disposed on the connector mounting surface. The methods may also include other suitable steps as disclosed herein.

Also disclosed are methods of making an interposer including forming an interposer from a silicon material so it has a connector mounting surface, and attaching a first pin and a second pin to the connector mounting surface. The method may include other steps as disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 3 and 4 are respective front and rear perspective views of the ferrule of the optical assembly shown in FIGS. 1 and 2;

FIGS. 5 and 6 are various perspective views showing the optical assembly shown in FIGS. 1 and 2;

FIG. 11 is a perspective view showing another interposer structure along with another optical assembly according to the concepts disclosed herein;

DETAILED DESCRIPTION

Figure 1:
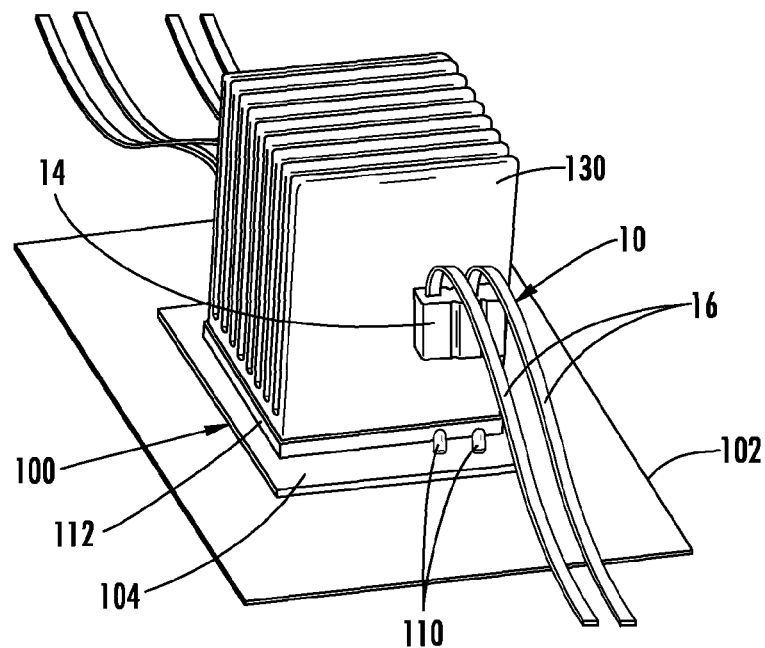
FIG. 1 is a perspective view of an interposer structure having an optical fiber interface for optical connection with one or more optical assemblies according to the concepts disclosed herein.

Reference is now made in detail to the present embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Disclosed are interposer(s) having an optical fiber connection for making an optical connection thereto along with interposer structures that use the interposers. As used herein, an "interposer" means an optical/electrical integrated circuit (IC) having an optical interface for communicating optical signals. The interposer concepts disclosed herein may be a portion of any suitable integrated circuit (IC) or formed as a discrete intermediate component for an integrated circuit as desired. Also disclosed are related optical assemblies and fiber optic connectors for attaching to the interposer. The interposer may be a portion of an self-contained IC or in another embodiment, the interposer acts as a signal bridge between the IC connected electrically to a circuit board or the like while also being able to process high-speed optical signals received from the interposer structure via the optical connection. Specifically, the interposer and the related optical connector provide a passively aligned structure and an optical interface. Embodiments, may include a matched thermal response to maintain proper optical alignment between a plurality of the optical fibers and optical paths on the interposer. The interposer, interpose structures and optical fiber connections such as optical assemblies described herein are advantageous since they provide a robust high-density optical solution that addresses the challenges for providing optical connectivity for an IC or to an IC via the interposer. Although embodiments may discuss the interposer as a discrete component from the IC the concepts of the interposer may be integrated as a portion of an IC.

FIG. 1 is a perspective view of an interposer structure 100 having an optical fiber connection configured to attach to an optical assembly 10 according to the concepts disclosed herein. The interposer structure 100 allows an integrated silicon photonics solution for providing an interposer with an optical interface or an optical connection to an integrated circuit (IC) or the like, thereby making an optical connection instead of solely having a conventional copper connection via an electrical connector. As shown, interposer structure includes a circuit board 102 and an interposer 104. The interposer 104 is attached to the circuit board 102 and may include communication links therebetween such as electrical connections. Interposer 104 includes a plurality of optical pathways (not visible) for transferring optical signals from optical assembly 10 to and integrated circuit 112 (i.e. chip) attached to the interposer or directly to the interposer, thereby providing optical communication. Interposer 104 also has alignment features that are configured as a first alignment pin 110 and a second alignment pin 110 for precisely aligning optical assembly 10 with the optical pathways of the interposer 104. The assembly shown also includes an exemplary heat sink 130 disposed on the integrated circuit 112 for cooling and providing a lower operating temperature for the IC, but other heat sinks, cooling fan, and/or other cooling arrangements are possible.

Figure 2:
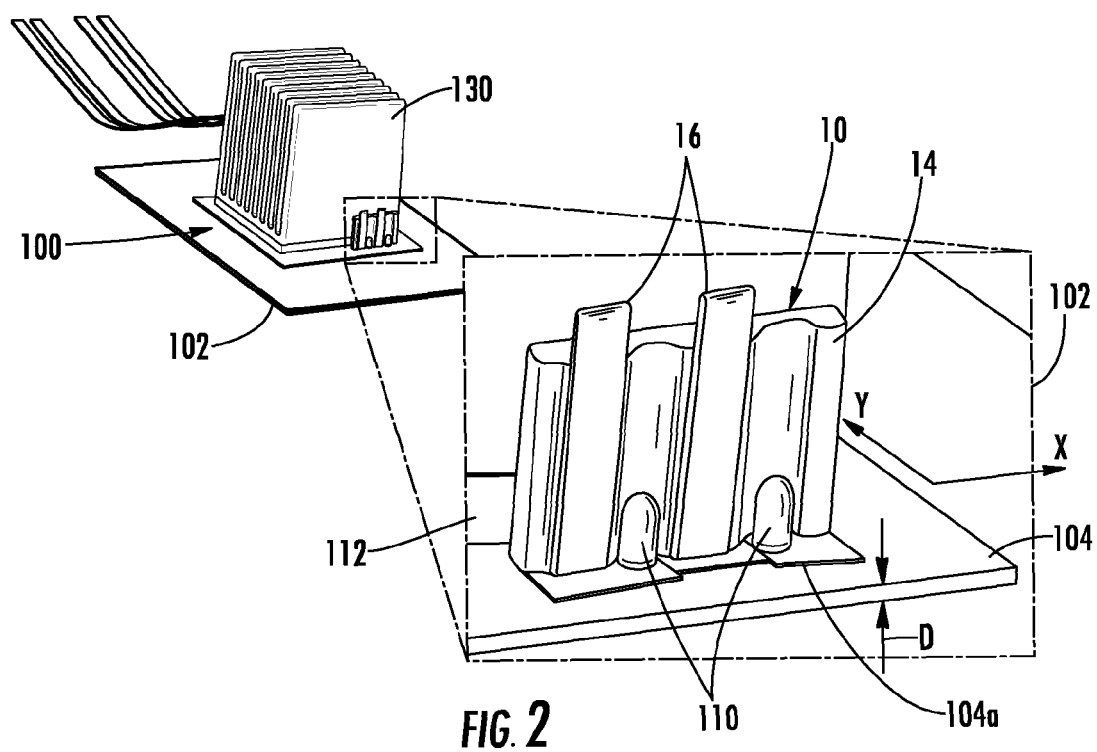
FIG. 2 is a perspective view of the interposer structure of FIG. 1 showing a detailed cross-section of the optical connection between the interposer and the optical assembly.

FIG. 2 is a perspective view of the interposer structure 100 showing a detailed cross-section of the optical connection between the interposer 104 and optical assembly 10 in a mated position. As shown, interposer 104 includes a connector mounting surface 104a where one end of the optical pathways (not visible) are exposed for optical connection with optical assembly 10. Optical assembly 10 includes a fiber optic connector ferrule 14 (hereinafter "ferrule") having a plurality of optical fibers 16 attached to the body of the ferrule as shown. The optical connection between the interposer 104 and the optical assembly 10 provides a relatively large number of optical connections in a relatively small area, thereby providing a large bandwidth connection without any of the concerns generally associated with electrical connections such as cross-talk, stray capacitance, etc. However, providing the precise alignment between the optical pathways of the interposer 104 and the optical fibers 16 of optical assembly 10 presents alignment challenges. For instance, the precise optical alignment needs to be maintained even with large temperature variations. Consequently, the coefficient of thermal (CTE) between the interposer material and ferrule material need to be matched to a given value (i.e., CTE delta between materials) for accommodating variations in temperature so that suitable optical connectivity is maintained. In one embodiment, the interposer 104 is formed or may include a silicon material such from a silicon wafer with the optical pathways formed on the silicon during a manufacturing process. In other words, different layers are formed onto the silicon during the manufacturing process. Moreover, the CTE of the ferrule material should be within a given range (e.g., CTE delta) of the interposer CTE for maintaining optical performance during temperature variations. As shown in FIG. 2, the interposer 104 includes a first pin 110 and a second pin 110 that extend from the connector mounting surface 104a and engage alignment features of ferrule 14 for providing precise alignment for optical connectivity to the optical pathways of the interposer 104. Specifically, the optical assembly 10 includes optical fiber openings (e.g., bores) that are arranged in a precise pattern that may be symmetrical or asymmetrical as desired. As non-limiting examples, the patterns may be arranged as linear and/or circular arrays that correspond to the optical pathways of the interposer 104. Shorter suitable distances from the optical fibers openings to the centerline of the controlling alignment pin may result in better CTE performance.

In this embodiment, a portion of the connector mounting surface 104a is recessed from a planar surface (not numbered) of the interposer and is formed during the manufacturing process. The profile of the connector mounting surface 104a generally conforms with the end face profile of ferrule 14, thereby allowing a portion of the ferrule 14 to be seated into the interposer 104 and inhibit off-axis forces on the optical assembly 10 from being applied to the pins 110. By way of example, the connector mounting surface 104a may be recessed from a planar surface of interposer 104 by a depth D such as 25 microns or more. The ferrule 14 may be held in position on the interposer 104 using a frame (not shown) or other structure for securing the optical connection. In further embodiments, the connector mounting surface may include one or more pin alignment features for precisely locating alignment pins relative to optical pathways of the interposer. By way of example, the interposer formed from silicon may have a first pin alignment feature and a second alignment feature precision formed in the connector mounting surface such as first and second recesses for receiving a portion of the respective pins. For instance, the recessed pin alignment features may be sized to have an interference or friction fit for receiving the pins in the desired locations. In other embodiments, the pins may be precisely located and attached using a vision based alignment or the like for placement on the connector mounting surface. As shown, optical assembly 10 has a first group of optical fibers 16 and a second group of optical fibers 16 spaced apart on the ferrule 14 and pins 110 cooperate with ferrule as will be discussed in more detail below.

Figure 14:
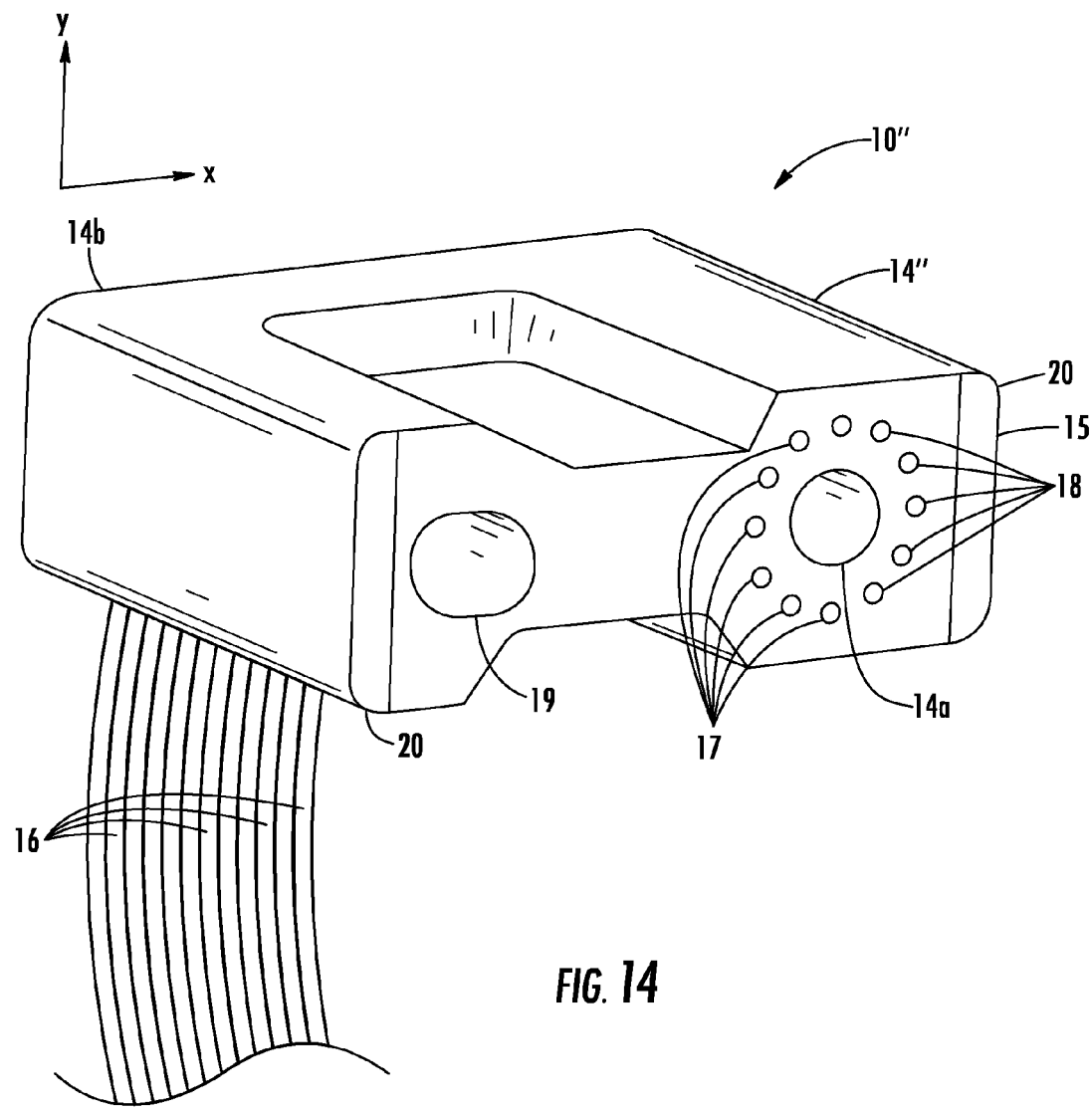
FIG. 14 is a close-up view of the end face of the ferrule of the optical assembly of FIGS. 11-13 showing the optical assembly having the optical fibers arranged in a circular array about the first alignment bore.

FIGS. 3 and 4 are respective front and rear perspective views of ferrule 14. Ferrule 14 includes a body having a front end 14a and a rear end 14b. In this embodiment, ferrule 14 includes a first plurality of optical fiber openings 17 and a second plurality of optical fiber openings 18 for receiving optical fibers along with a first alignment bore 15 and second alignment bore 19 for receiving pins 110 during mating of the optical assembly 10. As shown in FIG. 4, the first plurality of optical fiber openings 17 extend rearward to an opening 17a for inserting optical fibers into the ferrule 14. Likewise, the second plurality of optical fiber openings 18 extend rearward to an opening 17a for inserting optical fibers into the ferrule 14. Moreover, the first plurality of optical fiber openings 17 are disposed on a first side of first alignment bore 15 and the second plurality of optical fiber openings 18 are disposed on a second side of first alignment bore 15. The first plurality of fiber openings 17 and the second plurality of fiber openings 18 are aligned along a common axis (e.g., line or linear array) and disposed on opposite sides of the first alignment bore 15 as shown. Further, the first plurality of optical fiber openings 17 is disposed between the first alignment bore 15 and the second alignment bore 19. On the other hand, the second plurality of optical fiber openings 18 are disposed between the first alignment bore 15 and a periphery of the ferrule 14. Each plurality of optical fiber openings may have the same number or optical fibers openings such as six, eight, twelve, etc. or different numbers of optical fiber openings. Locating the optical fiber openings symmetrically about first alignment bore 15 generally provides an equal distance from this reference location, which may provide advantages for optical performance during thermal variations. Symmetric arrangements having a non-linear configurations for the fiber openings are also possible according to the concepts disclosed herein such as a circular array of fiber openings disposed about the first alignment bore as shown in FIG. 14. Additionally, the body of ferrule 14 includes one or more bumpers 20 for recessing a mating end face of the ferrule. In this embodiment, the bumpers 20 are located at opposite ends of front end 14a, but other embodiment may configure the bumper as a one-piece partial or full ring. The bumpers or the shape of the ferrule body may also be used for keying the optical assembly to the interposer.

With continued reference to FIGS. 3 and 4, the first alignment bore 15 has a round shape and the second alignment bore 19 has a non-round shape such as an oval shape. Using a non-round shape for the second alignment bore 19 of ferrule 14 along with round alignment pins on the interposer 104 may provide improved performance and/or eliminates stress/damage on the pins 110 of the interposer 104. Specifically, the first alignment pin 110 received in first alignment bore 15 having a round shape has a precision fit to the bore for providing alignment of the optical fibers 16 to the optical pathways in the X- and Y-directions. Whereas, the second alignment bore 19 is elongated along the X-direction to only provide alignment with pin 110 in the Y-direction (i.e., along the common axis of the optical fiber openings), thereby providing rotational alignment of along the common axis and inhibiting stresses on the pins/ferrule/interposer due temperature variations. Stated another way, significant changes in temperature will not cause large stresses if the CTE of between of the interposer material and ferrule material are not exactly the same (i.e., there is a CTE delta between materials.) because the ferrule 14 is only fixed at one location and can expand or contract in either direction from the first alignment bore 15.

In one embodiment, ferrule 14 is formed from a material that has a CTE that is matched to the CTE for the interposer material, but in practice the materials will be different and there will be a CTE delta. However, the ferrule material should be selected to provide the desired performance and material characteristics along with an acceptable CTE delta between the ferrule material and interposer material. By way of example, an acceptable CTE delta between the ferrule material and the interposer material at ambient conditions is about $4.0 \times 10^{-6\circ}$ C. ($\Delta$mm/mm) in one embodiment, about $2.0 \times 10^{-6\circ}$ C. ($\Delta$mm/mm) in another embodiment, and about $1.0 \times 10^{-6\circ}$ C. ($\Delta$mm/mm) in a further embodiment. A typical silicon material is isotropic and has a CTE value of $2.6 \times 10^{-6\circ}$ C. ($\Delta$mm/mm) at ambient conditions. Thus, for the example given the CTE of the ferrule materials is $2.6\times10^{-6\circ}$ C.$\pm1.0\times10^{-6\circ}$ C. at ambient conditions An example of a suitable ferrule material is a polymer that includes a filler to help maintain the desired CTE delta with the interposer material. By way of example, the filler of the polymer material has a relatively high percentage. For instance, of 40 percent or more by weight, or 70 percent or more by weight. An example of a suitable polymer having a glass filler of 70 percent or more by weight. Other materials besides glass are possible for the filler material(s) such as ceramics like aluminosilicate glass-ceramic, borosilicate glass, quartz, and the like. Of course, non-filled materials may be used for ferrule 14 if they have suitable characteristics and properties. As a non-limiting example of a low CTE non-polymer material that may be used for the ferrule is a nickel iron alloy available under the tradename INVAR (e.g., 64FeNi).

Figure 6:
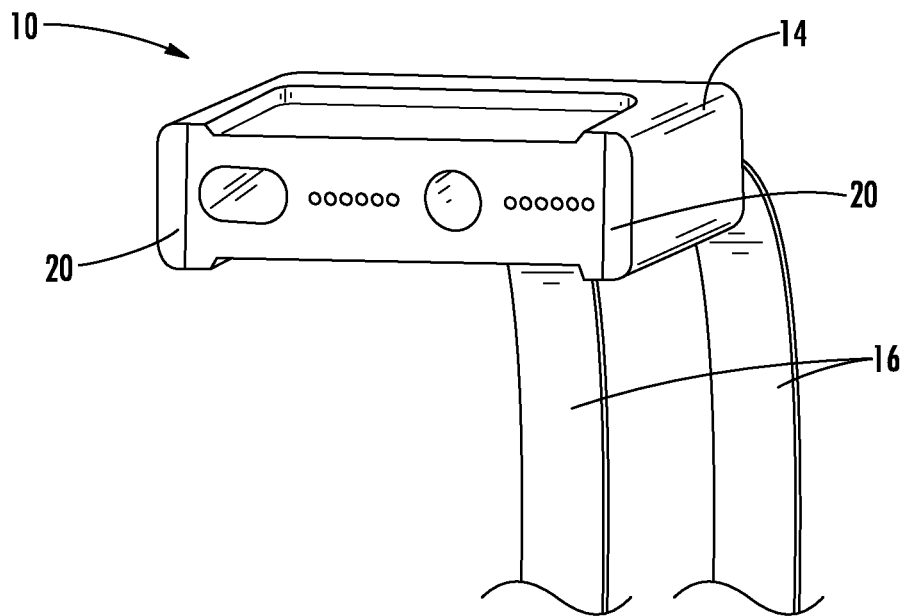

FIGS. 5 and 6 are various perspective views showing optical assembly 10. The mating end face of ferrule 14 and the optical fibers may be finished using any suitable method such as a laser processing and/or a mechanical polish. Other variations of the ferrule for the optical assembly are also possible according to the concepts disclosed herein such as varying the shape of ferrule body such as square or other shapes, different arrangement for the alignment structure.

Also disclosed are methods of making an interposer including forming an interposer from a silicon material so it has a connector mounting surface and attaching a first pin and a second pin to the connector mounting surface. In one embodiment, the connector mounting surface is formed so it is recessed from a planar surface of the interposer. For example, the interposer may be etched as known in the art so that the connector mounting surface has a recessed surface with precision geometry that generally conforms to the end face of a complimentary connector ferrule. Moreover, a plurality of optical pathways may also be formed into interposer for directing optical signals from/to the interposer or integrated circuit and to/from the optical fibers of the optical assembly. Still further, the connector mounting structure may also include alignment features for aligning and attaching the connector ferrule of the optical assembly. By way of example, the method may include attaching the first pin to a first pin alignment feature disposed at the connector mounting surface and attaching the second pin to a second pin alignment feature disposed at the connector mounting surface. As one example, the pin alignment features may be precision etched into the connector mounting surface or formed in other manners to provide micron or sub-micron alignment of the pins to the optical pathways on the interposer. Thus, an optical assembly such as described herein may be attached to the connector mounting surface of the interposer for creating an optical connection.

Figure 7:
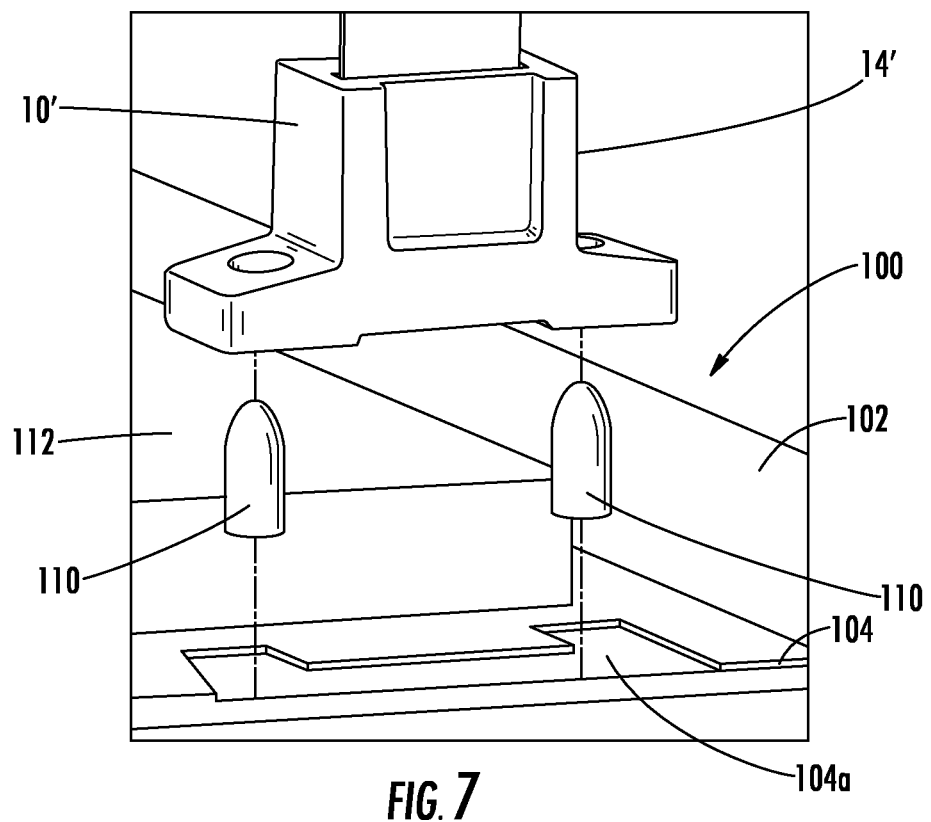
FIGS. 7-10 are views showing various steps for making an explanatory interposer structure according to the concepts disclosed herein.

Illustratively, FIGS. 7-10 depict various views showing explanatory steps for making an interposer structure according to the concepts disclosed herein. FIG. 7 is a partially exploded close-up view of interposer structure 100 along with an optical assembly 10'. Optical assembly 10' is similar to optical assembly 10, but uses a ferrule 14' that only includes a first plurality of optical fiber openings having optical fibers disposed between the first and second alignment bores unlike optical assembly 10. As shown, first pin 110 and second pin 110 are shown before being attached to interposer 104 and after integrated chip 112 is aligned and attached to the interposer 104. Pins 110 have a suitable size, shape and spacing on the interposer 104 to cooperate with the first and second alignment bores on the connector ferrule and properly align the optical fibers of optical assembly 10' with the optical pathways of interposer 104. By way of example, the pins may have a round shape with a diameter of 700 microns, but other suitable sizes and/or non-round shapes are possible for the pins.

Interposer 104 includes a portion of the connector mounting surface 104a that is recessed from a planar surface of the interposer 104. In this embodiment, the interposer 104 is formed from silicon material and the recessed connector mounting surface 104a is precision formed using a resist layer during a vapor deposition process to conform with the end face of the connector ferrule of optical assembly 10'. The recessed connector mounting surface 104a has a suitable depth such as 25 microns or greater, but other suitable depths are possible. Additionally, like optical assembly 10, the connector ferrule of optical assembly 10' is formed by a materials that has a CTE that is generally matched to the CTE of the silicon interposer 104. By way of example, the CTE of the connector ferrule and the CTE interposer are matched with a delta between CTE of the ferrule material CTE is within 40% percent of the interposer CTE, but other values for CTE matching are possible and may be influenced by design specifics.

Figure 8:
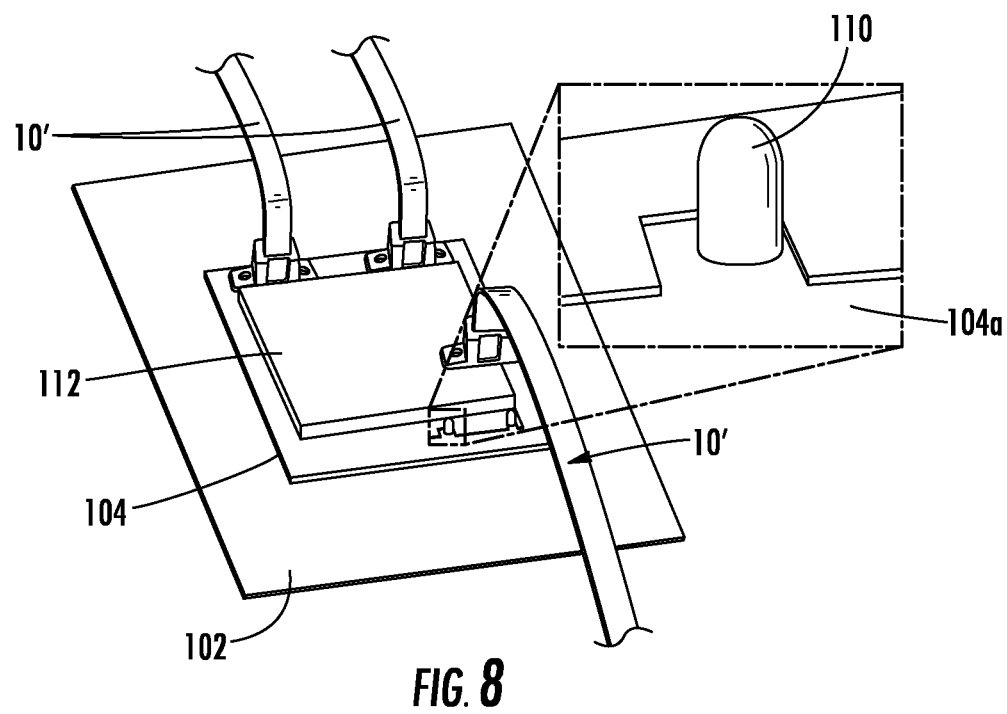
Figure 9:
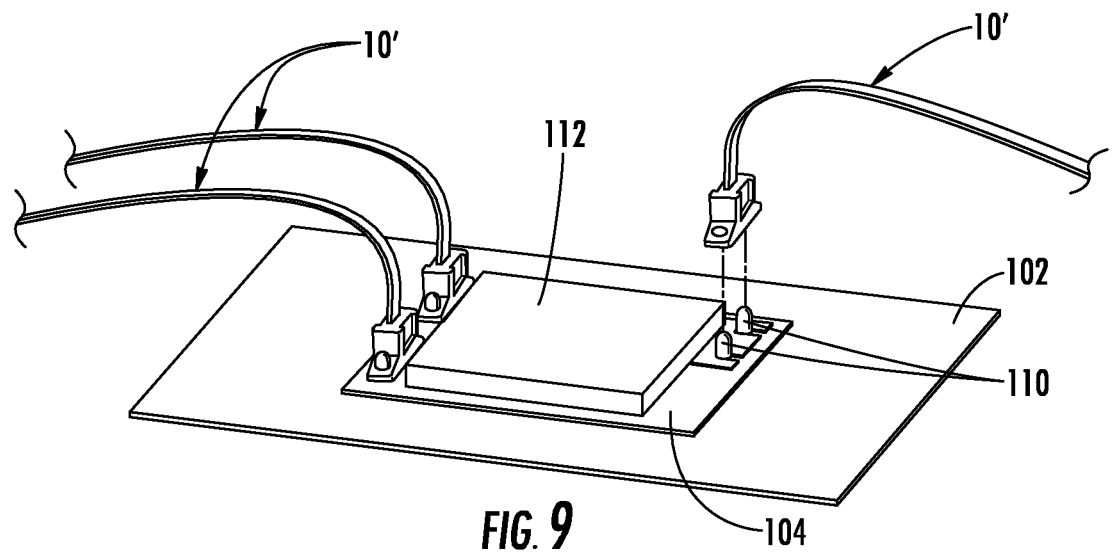
Figure 10:
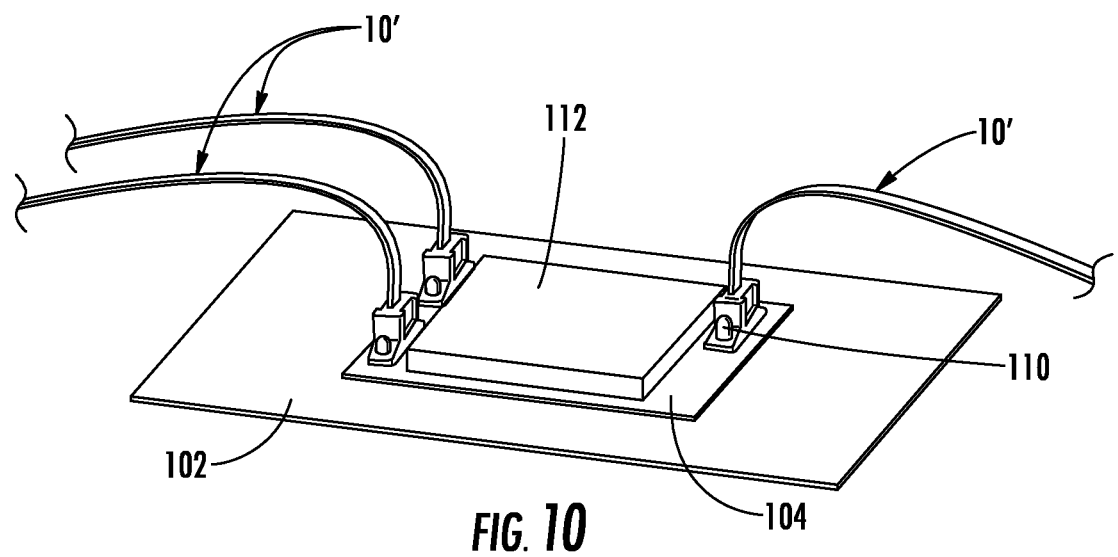

FIG. 8 depicts first and second pins 110 mounted to the desired locations of the connector mounting surface 104a. In this particular embodiment, first and second pins 110 are referenced to a corner location of the connector mounting surface 104a as shown for providing precise alignment relative to the optical pathways on the interposer 104. By way of example, first and second pins 110 are aligned to within 1 micron or less of the reference centerline location on the connector mounting surface. One passive alignment technique for maintain this precision alignment for the pins relative to the optical pathways of the interposer is to form precise pin recess locations for inserting the first and second pins 110 during the etch process that forms the interposer. Thus, the pin recess locations can be referenced and formed during the interposer forming process and controlled to the desired degree. Another way to precisely form and place the pins is to mechanically lap or polish corners onto the pins for precise placement into the corners of the connector mounting surface. FIG. 9 depicts the right side optical assembly 10' before being attached to interposer 104 and FIG. 10 depicts the optical assembly 10' after being attached to interposer 104. A frame or other suitable device may be used for securing one or more of the optical assemblies 10' to the interposer 104 by securing the frame or device to circuit board 102.

FIG. 11 is a perspective view showing another interposer structure 100' similar to interposer structure 100 along with another optical assembly 10" attached to the interposer 100', which may use concepts disclosed herein. Interposer structure 100' includes a circuit board 102 and an interposer 104' with electrical connections therebetween for transmitting high-speed electrical signals. Interposer 104' having a connector mounting surface 104a that is matched for optical connection with optical assembly 10", which has a different non-linear footprint for the optical fiber openings of ferrule 14". The assembly also includes a heat sink 130' having one or more portions 130a that extend beyond the footprint of IC 112 for providing more surface area to improve cooling.

Figure 12:
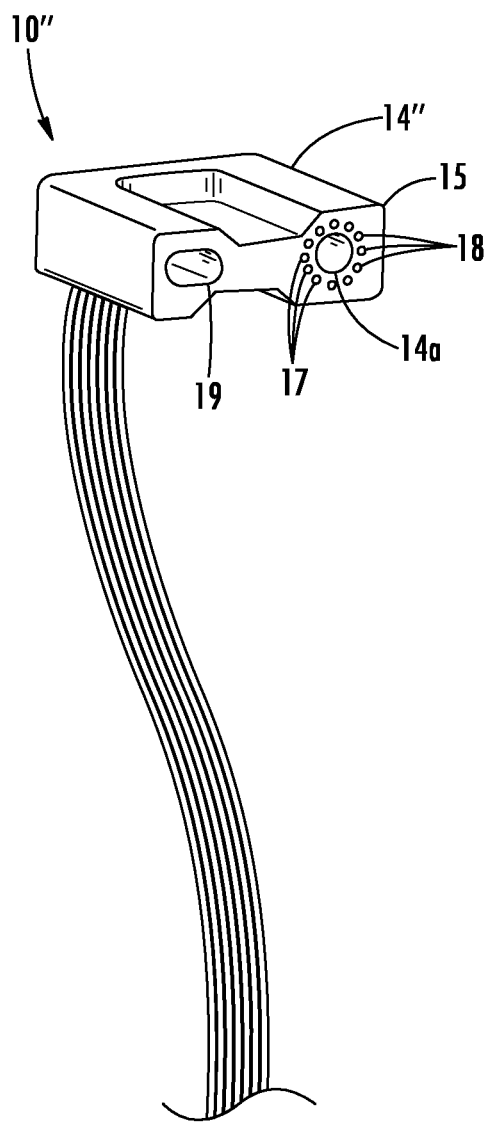
FIGS. 12 and 13 are respective front and rear perspective views of the optical assembly shown in FIG. 11.
Figure 13:
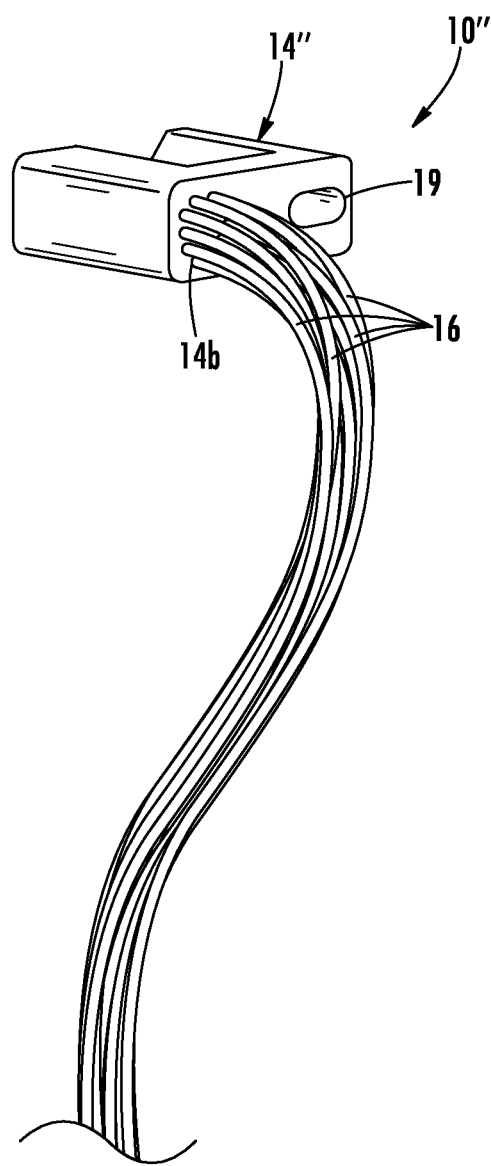

FIGS. 12 and 13 are respective front and rear perspective views of the optical assembly 10", which is similar to optical assembly 10. Optical assembly 10" includes a ferrule 14" with a body and a plurality of optical fibers 16 attached to the ferrule 14". Like ferrule 14, ferrule 14" includes first alignment bore 15 having a round shape and second alignment bore 19 having a non-round shape. However, the first optical fiber openings 17 and the second fiber openings 18 of ferrule 14" are arranged in a different manner compared with ferrule 14.

FIG. 14 is a close-up view of the end face of the ferrule 14" of the optical assembly 10". As shown, the first plurality of optical fiber openings 17 are disposed on a first side of the first alignment bore 15 and the second plurality of optical fiber openings 18 are disposed on a second side of the first alignment bore 15 showing the optical assembly having the optical fibers arranged in a circular array about the first alignment bore. Using a circular array with a single ring of optical fiber openings that is concentric to the first alignment bore 15 positions the individual optical fiber openings in the ferrule all about the same distance from the centerline of the first alignment bore and may be beneficial for thermal performance for this reason. Other variations are also possible such as having more than one circular array disposed about the first alignment bore in a concentric manner to increase the number of optical connections.

Figure 15:
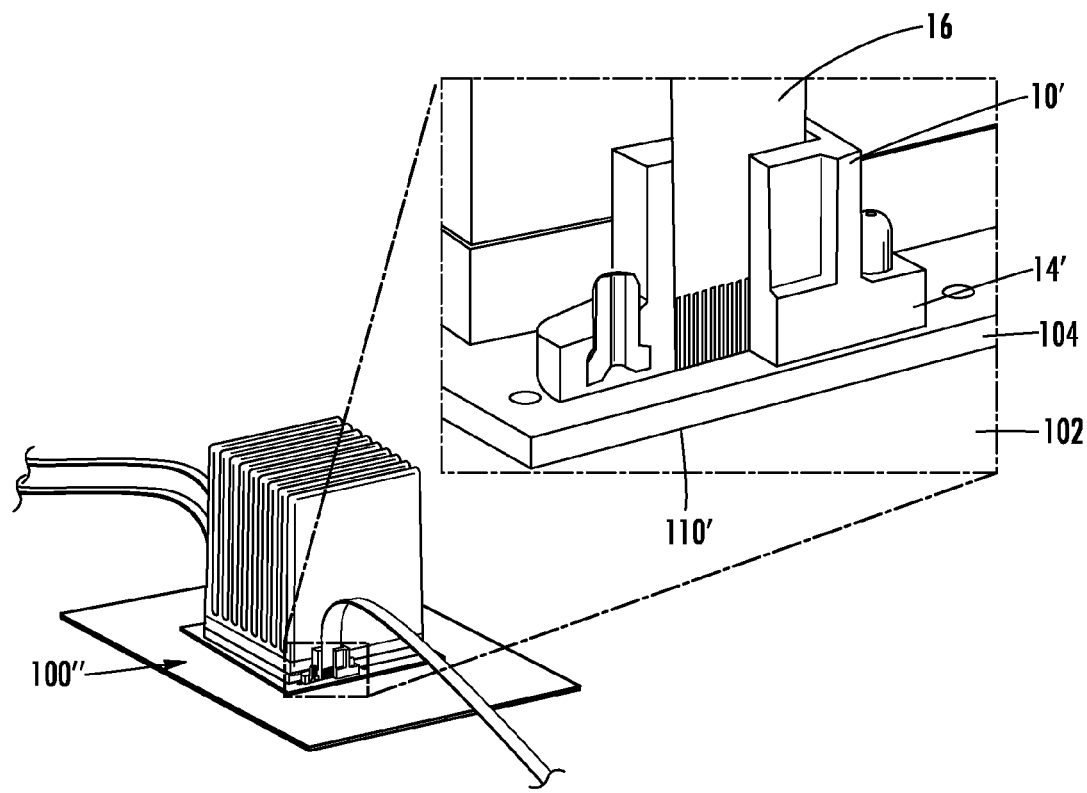
FIG. 15 is a perspective view along with a partial cutaway view showing another interposer structure along with the optical assembly of FIG. 7 according to the concepts disclosed herein.
Figure 16:
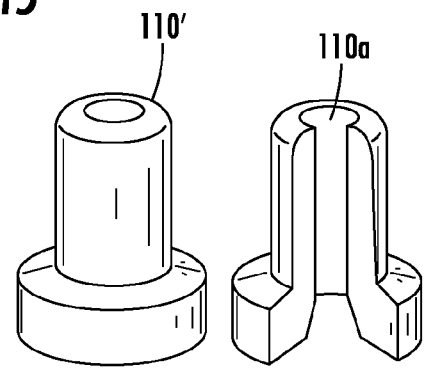
Figure 17:
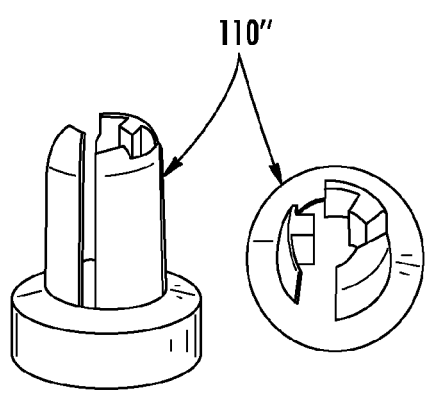

FIG. 15 is a perspective view showing another interposer structure 100" similar to interposer structure 100 along with the optical assembly of 10' attached thereto. Interposer 104 includes a connector mounting surface where one end of the optical pathways (not visible) are exposed for optical connection with optical assembly 10' as discussed herein. In this embodiment, first and second alignment pins 110' are attached to the interposer 104. As best shown in FIG. 16, alignment pins 110' include a hollow portion 110a. Hollow portion 110a allows the pins to be attached using a UV curable adhesive and still allowing curing no matter the material used since UV radiation can enter the opening at the top of the hollow portion 110a for curing. Moreover, the hollow portion 110a allows a space for the adhesive to flow and bond the parts. In this embodiment, hollow portion 110a of pin 110' extends from the top of the pin to the bottom of the pin, but this may not be necessary. Pins 110' may be formed from any suitable material such as a polymer, metal or the like.

The use of pins on the interposer can allow various methods of making the interposer structure. For instance, the pins may be actively aligned to the interposer optical pathways using a ferrule or a jig for fixturing. By way of explanation, the pins are held in the bores of the ferrule or jig and the optical fibers of the ferrule or jig are actively aligned. Once the desired placement is located the pins can then be bonded to the interposer such as by curing a UV adhesive or the like. Further, the pins with hollow portions 110a can also application of the adhesive before or after active alignment of the ferrule or jig with the optical pathways on the interposer. For instance, the adhesive may be applied to the pins prior to placement on the interposer or the adhesive may be injected from the top of the hollow portion 110a into the pin 110 for minimizing the flow of excess adhesive about the pin. Then, the ferrule or jig may be removed from the interposer and pins as desired.

Figure 17:
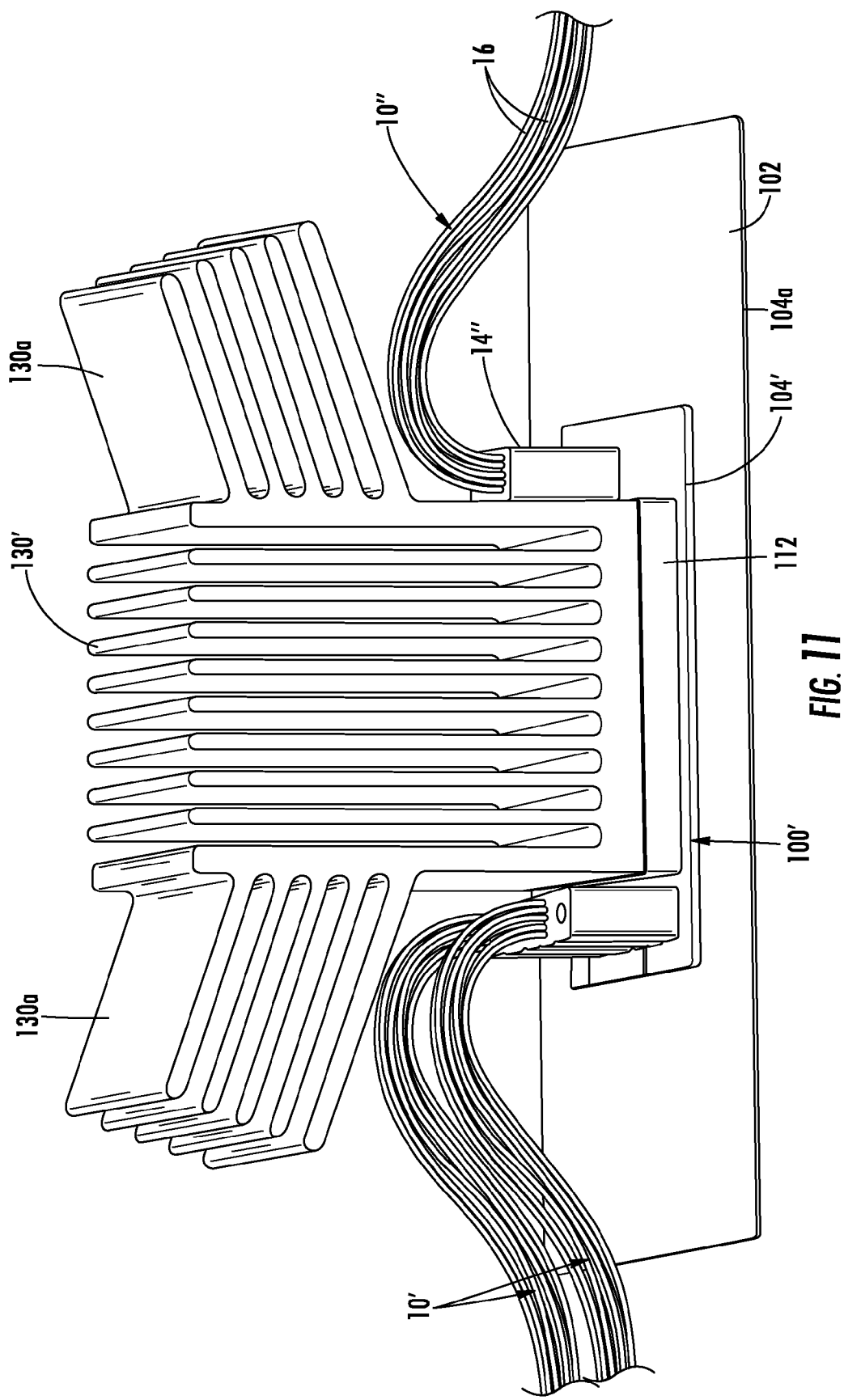
FIGS. 16-19 are various views of different alignment pins that may be used on the interposer according to the concepts disclosed.
Figure 18:
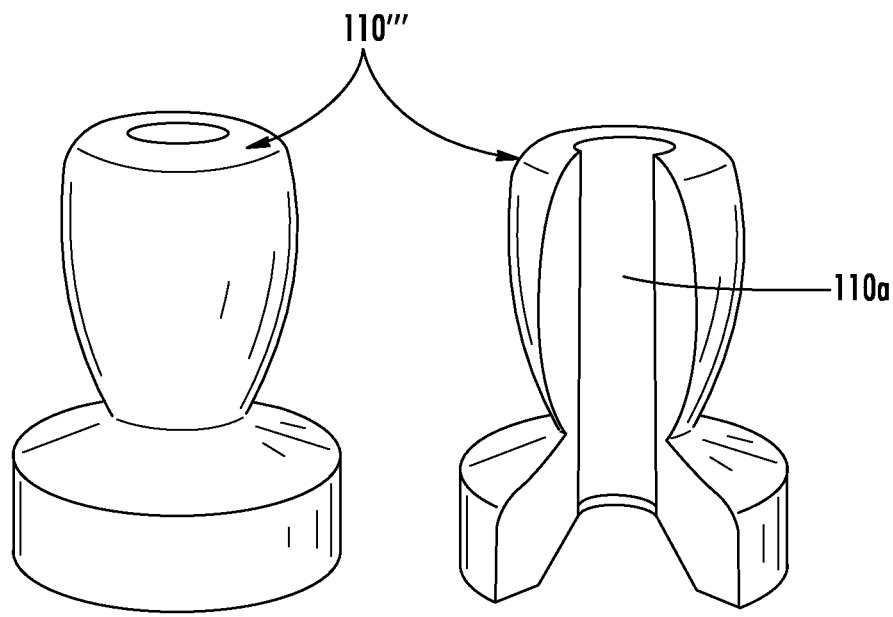
Figure 19:
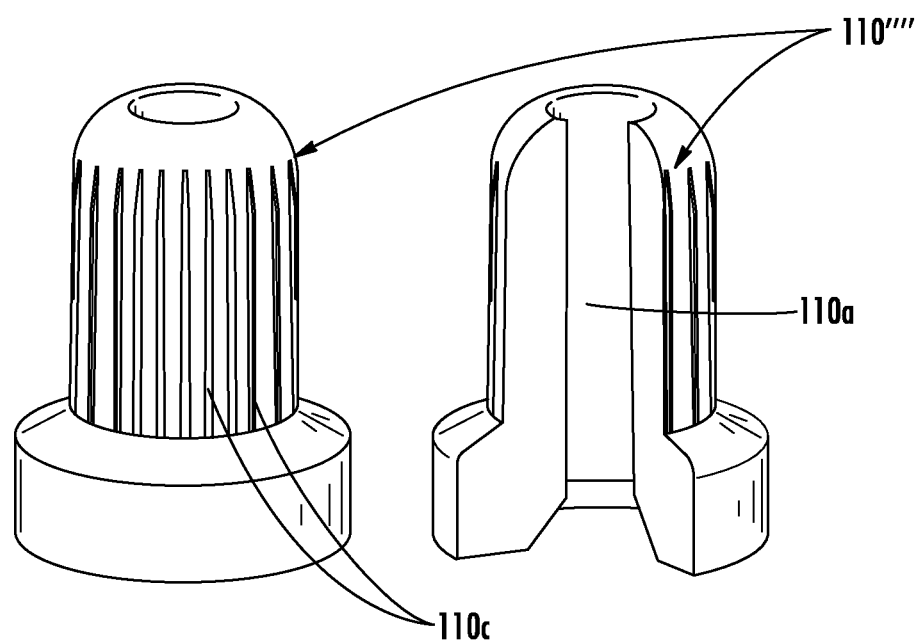

Of course, other variations of pins are possible according to the concepts disclosed. Illustratively, FIGS. 17-19 are various views of different alignment pins that may be used on the interposer according to the concepts disclosed. FIG. 17 shows a pin 110" having a castellated portion 110b. Castellated portion 110b allows the interposer structure and optical assembly to handle relative CTE mismatch by allowing the pins 110" to deform when under strain while still remaining "self-centering." Pins having castellated portions will need to be formed so they have a resilient character and so they can return close to original shapes/sizes. Other variations of pins may also have a resilient characteristic. For instance, FIG. 18 depicts pins 110''' having a hollow portion 110a that also provides a resilient characteristic by using a bulbous portion. Still other variations of pins are possible such as pin 110'''' shown in FIG. 19. In addition to having hollow portion 110a, pins 110'''' include a plurality of splines 110c that provide an interference fit with the alignment bores of the cooperating ferrule. Of course, it is possible that the hollow portions of the pins could be eliminated if the material used for the pins was formed from a UV transmissive material or a heat cured adhesive, solder, etc. was used.

Other optical alignment structures (e.g., optical alignment features) for the interposer structures and/or optical assemblies are possible that do not employ alignment pins and respective alignment bores on the ferrule for making an optical interconnection such as shown in the previous embodiments. For instance, the optical alignment structure may be formed by a portion of the interposer such as a resist layer of the interposer. Illustratively, FIGS. 20-25 are directed to an interposer structure 200 and/or its complimentary optical assembly 210. Interposer structure 200 is similar to the other interposer structures described herein, but the interposer structure 200 does not include alignment pins for aligning the optical interconnection between the optical interface of the interposer structure 200 and the optical assembly 210. Instead, an interposer 204 of interposer structure 200 includes a reference datum at the connector mounting surface 204a for aligning with a complementary reference datum of a ferrule 214 of the optical assembly 210, thereby providing optical alignment. Consequently, alignment of the respective reference datums aligns the plurality of optical fibers 16 with the optical pathways of the interposer 204 for making an optical interconnection.

Figure 20:
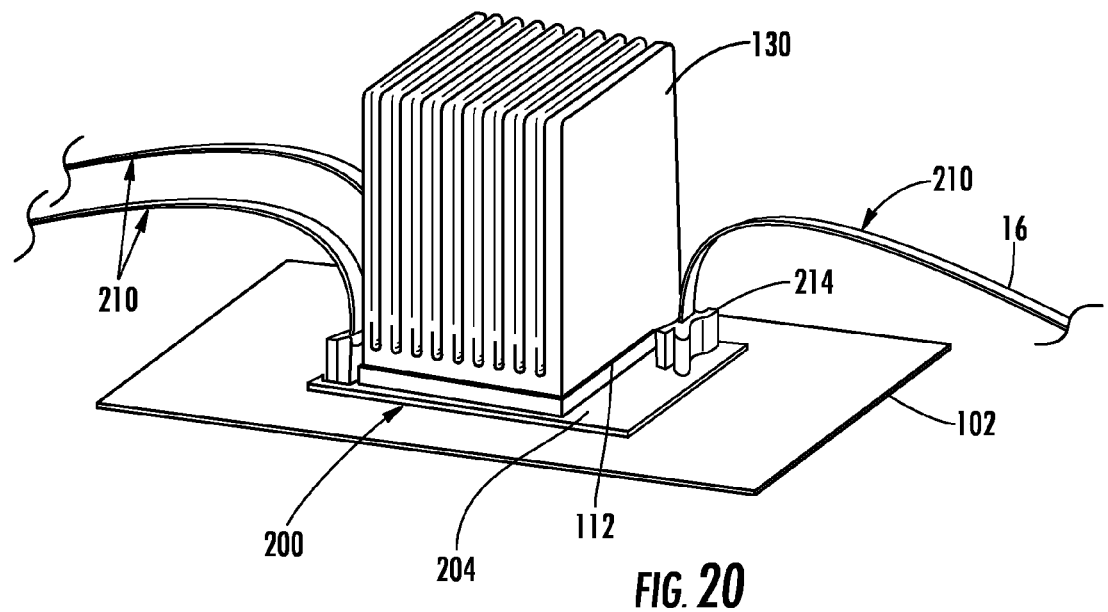
FIG. 20 is a perspective view of another interposer structure having an optical interface for optical connection with another optical assembly according to the concepts disclosed herein where the frame for holding the optical assemblies to the interposer structure is removed.

Specifically, FIG. 20 is a perspective view showing interposer structure 200 with an optical pathways (not visible) that end at an optical interface OI (FIG. 23) for optical connection with optical assembly 210. Like other optical assemblies disclosed, optical assemblies 210 include a ferrule 214 attached to optical fibers 16 and is held in position on the interposer structure 200 using a suitable structure such as a frame (which is removed for clarity), but other attachment structures are possible. Interposer structure 200 provides an integrated silicon photonics solution for providing an optical connection to the interposer or an integrated circuit (IC) or the like for making an optical connection with the IC instead of solely having a conventional electrical (i.e., such as copper) connection such as an electrical connector. Interposer structure 200 includes a circuit board 102 and an interposer 204. As discussed above with respect to the other interposers, interposer 204 is attached to the circuit board 102 and my include a communications link therebetween using electrical connections. In other words, the interposers disclosed may have both electrical and optical connectivity.

Figure 21:
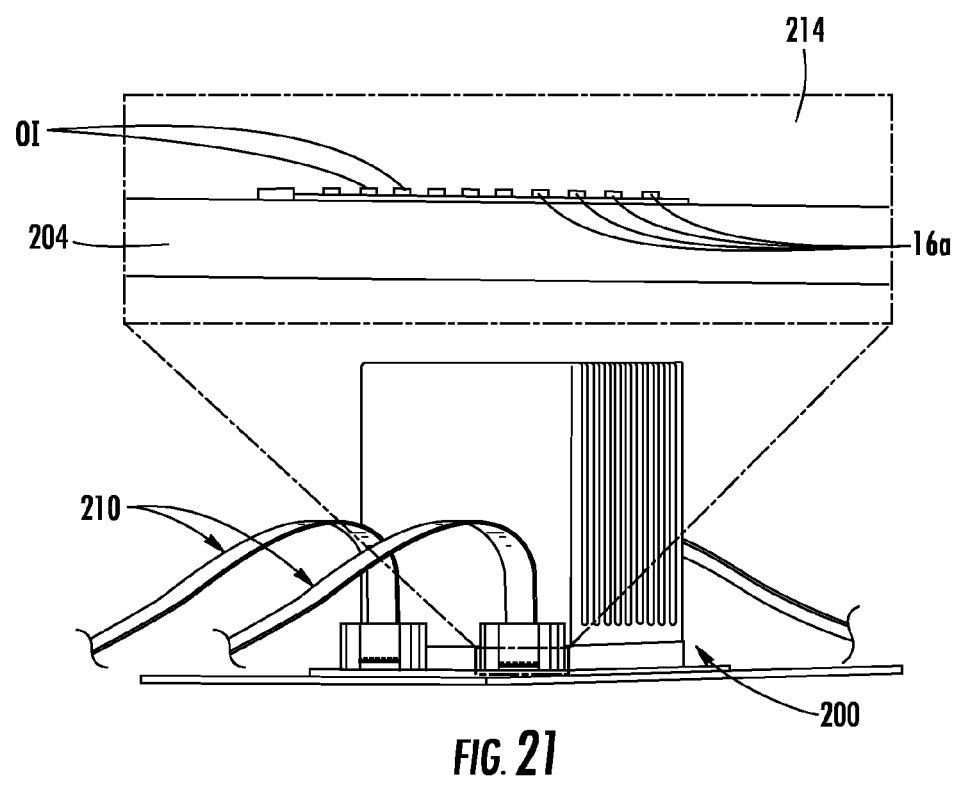
FIGS. 21 and 22 are partial sectional views of the interposer structure of FIG. 20 showing the optical connection between the interposer structure and the optical assembly.
Figure 22:
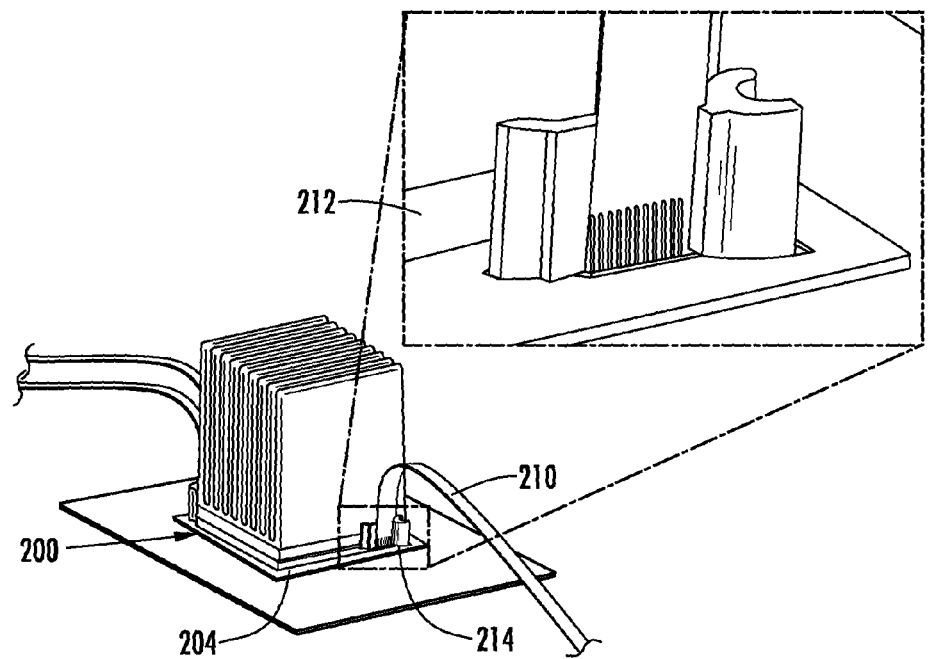

FIGS. 21 and 22 show partial sectional views of the optical connection between the interposer structure 200 and the optical assembly 210. Optical connectivity with the interposer 204 is provided by a plurality of optical pathways of interposer 204 that end at optical interface OI. As shown, the optical pathways of interposer 204 optically connect with optical assembly 210 for transferring optical signals between the interposer 200 and optical assembly 210. Specifically, the optical interface OI of interposer 204 optically connect with optical fibers 16 of optical assembly 210. Interposer 204 includes a connector mounting surface 204a and a suitable optical alignment structure OAS. Optical alignment structure OAS includes one or more optical alignment features for aligning one or more of the optical fibers of the optical assembly 210 with the optical interface OI as discussed in more detail below. To improve optical coupling, an index matching material may be used between the ends 16a of the optical fibers 16 and the optical interface OI.

Like the other interposers discussed herein, the interposer 204 may be formed from a suitable material such as including a silicon material such as a silicon wafer with the optical pathways formed onto the silicon during a manufacturing process where different layers are formed on the silicon. In this embodiment, the optical alignment structure is formed by a resist layer RL of the interposer 204. The resist layer RL may be patterned on the interposer 204 with a suitable shape for providing a datum for registering with another complimentary datum on the ferrule 214. Resist layer RL may be patterned using any suitable method such as LIGA (Lithographic Galvonoformung Abformung) process, thereby forming a microstructure with the desired pattern for optical alignment. By way of example, a UV LIGA process may be used, but other LIGA processes are possible such as a X-ray LIGA process. The resist layer RL formed by the LIGA process may form the desired pattern to create an optical alignment structure. By way of example, an integrated circuit 212 is shown attached to the interposer 204 for optical communication therewith.

Methods of making an interposer include the steps of forming an interposer from a silicon material so it has a connector mounting surface with an optical interface, and forming an optical alignment feature in the interposer that is disposed adjacent to the connector mounting surface. Methods may further include forming an optical alignment feature in a resist layer of the interposer. By way of example, a connector mounting surface or a protrusion such as one or more alignment pins may be formed in the resist layer of the interposer. The connector mounting surface may be formed as a recessed portion from a planar surface of the interposer at any suitable depth. In another embodiment, the one or more optical alignment features is a fiber rake.

Figure 23:
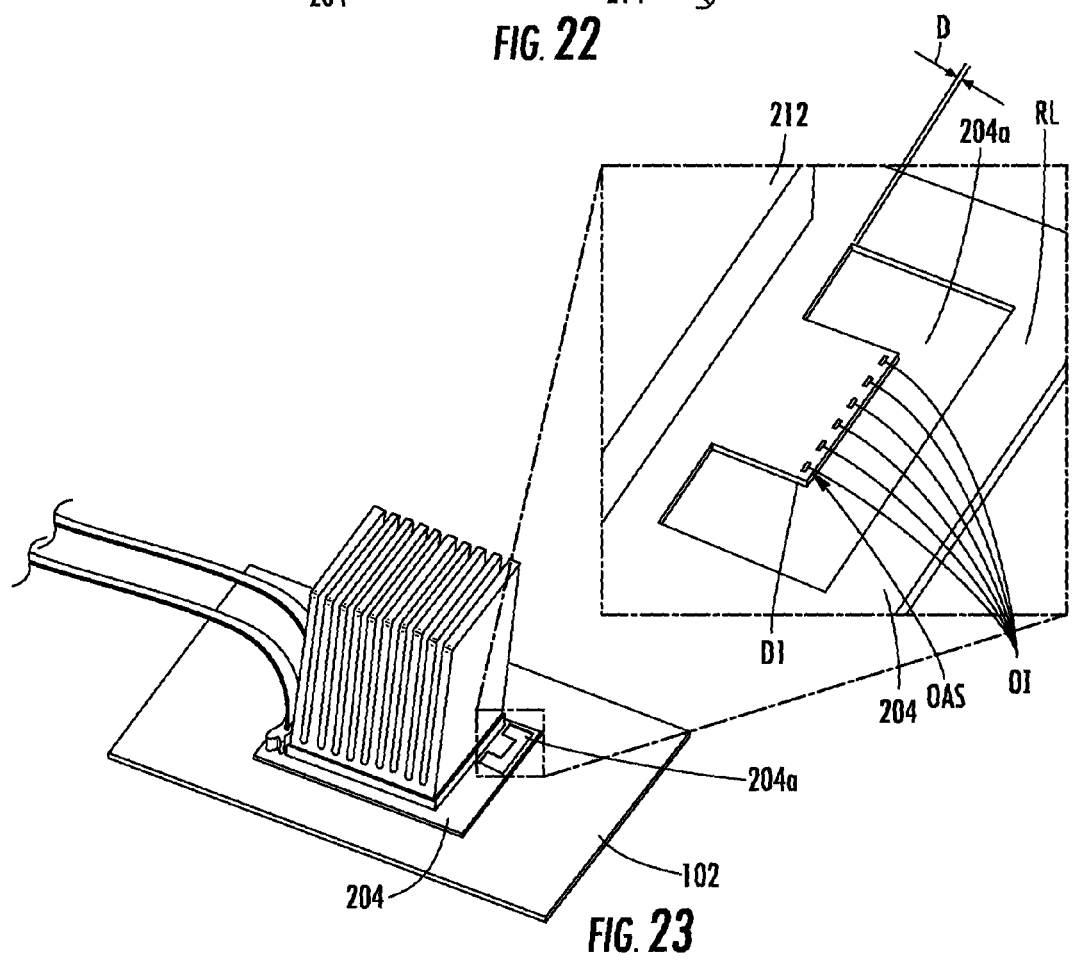
FIG. 23 is a detailed perspective view of the interposer of FIG. 20 with one of the optical assemblies removed to show the optical interface and the connector mounting surface of the interposer.

FIG. 23 is a detailed perspective view of the interposer 204 with one of the optical assemblies 210 removed to show the optical interface OI and the connector mounting surface 204a of the interposer 204. As shown, the connector mounting surface 204a is recessed from a planar surface of the interposer 204 by depth D. Depth D may be any suitable value depending on the desired optical alignment structure used. By way of example, depth D may have a relatively shallow depth such as 15 microns or less like in the range of 5-10 microns for this embodiment; but other depths D are possible such as up to 200 microns or more depending on the particular structure used for optical alignment. In this embodiment, the recess of the connector mounting surface 204a has a U-shape. Additionally, the optical interface OI is not located in the recessed portion, but rather extends to the planar surface of interposer 204 as shown. The profile of the connector mounting surface 204a generally conforms with the end face profile of the ferrule 214 for positioning the optical fibers at the optical interface OI.

Figure 24:
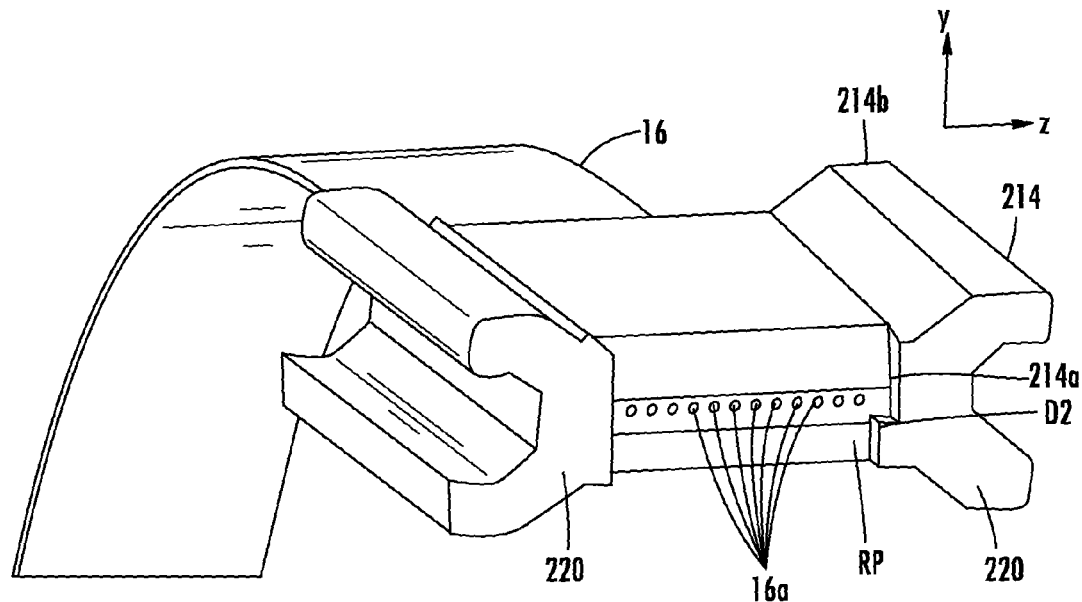
FIG. 24 is a perspective end view of the ferrule of the optical assembly shown in FIGS. 20-23.
Figure 25:
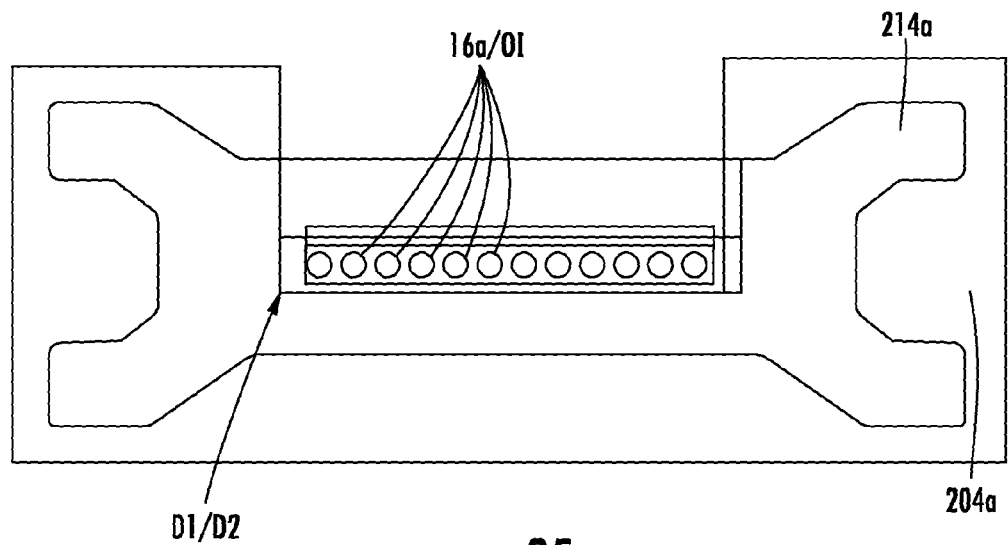
FIG. 25 is an end line view representation of the end footprint of the ferrule of the optical assembly of FIG. 24 shown in position when aligned and attached to the connector mounting surface of the interposer structure of FIG. 23 to show alignment of respective datums.

FIG. 24 is a perspective end view showing the ferrule 214 of the optical assembly 210. Ferrule 214 is similar to ferrule 14 since it has a body with a front end 214a and a rear end 214b with a plurality of optical fiber openings therebetween for receiving the plurality of optical fibers 16. However, ferrule 214 is different from ferrule 14 since it does not include alignment bores, but instead has a datum D2 for aligning with a datum D1 on at the connector mounting surface 204a for aligning the optical interfaces for optical interconnection. As depicted, datum D2 of ferrule 214 is formed as a recessed portion RP relative to one or more bumpers 220 where the respective ends 16a of the plurality of optical fibers 16 are located at the recessed portion RP. Moreover, one or more bumpers 220 include a ledge in the X-direction and a ledge in the Y-direction for creating the datum D2 such as a corner on the front end of the ferrule 214 used for alignment with datum D1 on the interposer 204 that is formed by the resist layer RL. In other words, the bumpers 220 create a precision datum D2 that aligns the ferrule in the X- and Y-directions such as provided by a L-shaped sidewall or the like. FIG. 25 is an end line view representation of the end footprint of ferrule 214 shown in position when aligned and attached to the connector mounting surface 204a of the interposer 204. In other words, FIG. 25 depicts the end face of the ferrule 214 superimposed onto connector mounting surface 204a for showing the engagement of the optical interconnection. As depicted, the respective datums D1/D2 of the ferrule 214 and interposer 204 are aligned and mated at the respective corner geometry (e.g., the datums) of the ferrule 214 and the complimentary corner of the interposer 204. In this embodiment, the connector mounting surface 204a has a generally U-shaped surface as shown and the ferrule end face has a complimentary surface for aligning with the connector mounting surface for aligning the ends 16a of the plurality of optical fibers 16 with the optical interface OI of the interposer 204. Of course, other geometries are possible for creating the optical alignment structure from the resist layer with the connector mounting surface recessed from a planar surface of the interposer.

Additionally, creating optical alignment structure from the resist layer of the interposer may be used for creating protruding portions for optical alignment with or without recessed portions in the resist layer. By way of example, FIGS. 26-30 depict another concept for forming optical alignment structure in the resist layer of the interposer. In this embodiment, the optical alignment structure in the resist layer of the interposer has a connector mounting surface that is recessed from the planar surface of the interposer, but also includes one or more protrusions formed from the resist layer. Specifically, the one or more protrusions in this embodiment are configured as alignment pins integrally formed as a portion of the interposer, but other protrusion structures are possible using the resist layer.

Figure 26:
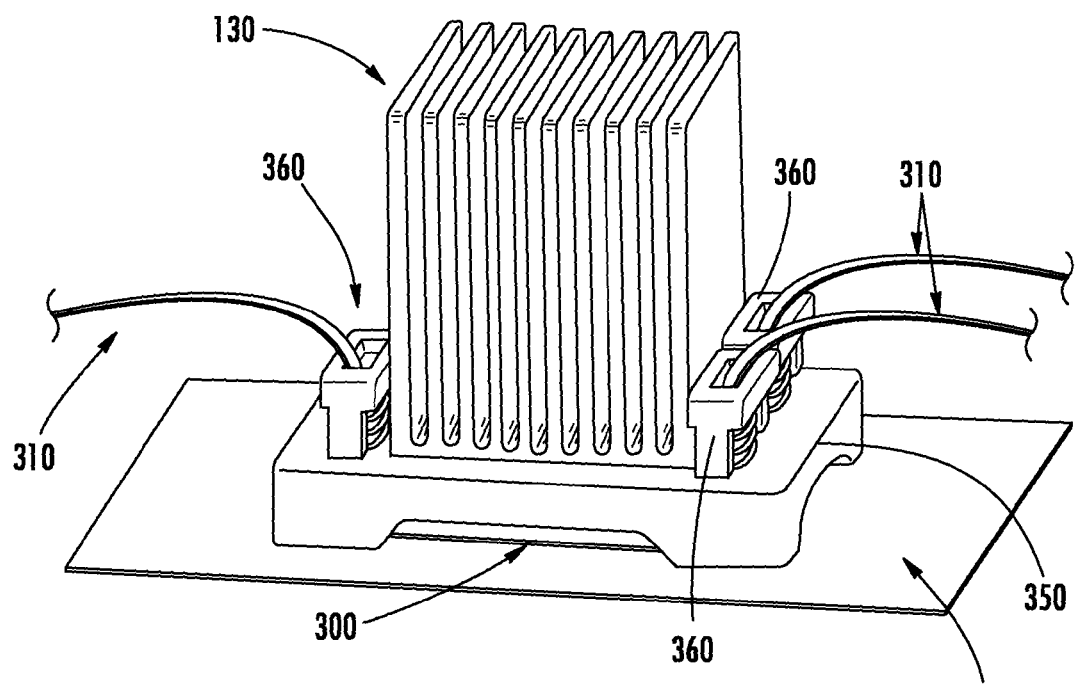
FIG. 26 is a perspective view of still another interposer structure having an optical fiber interface for optical connection with one or more optical assemblies according to the concepts disclosed herein.
Figure 27:
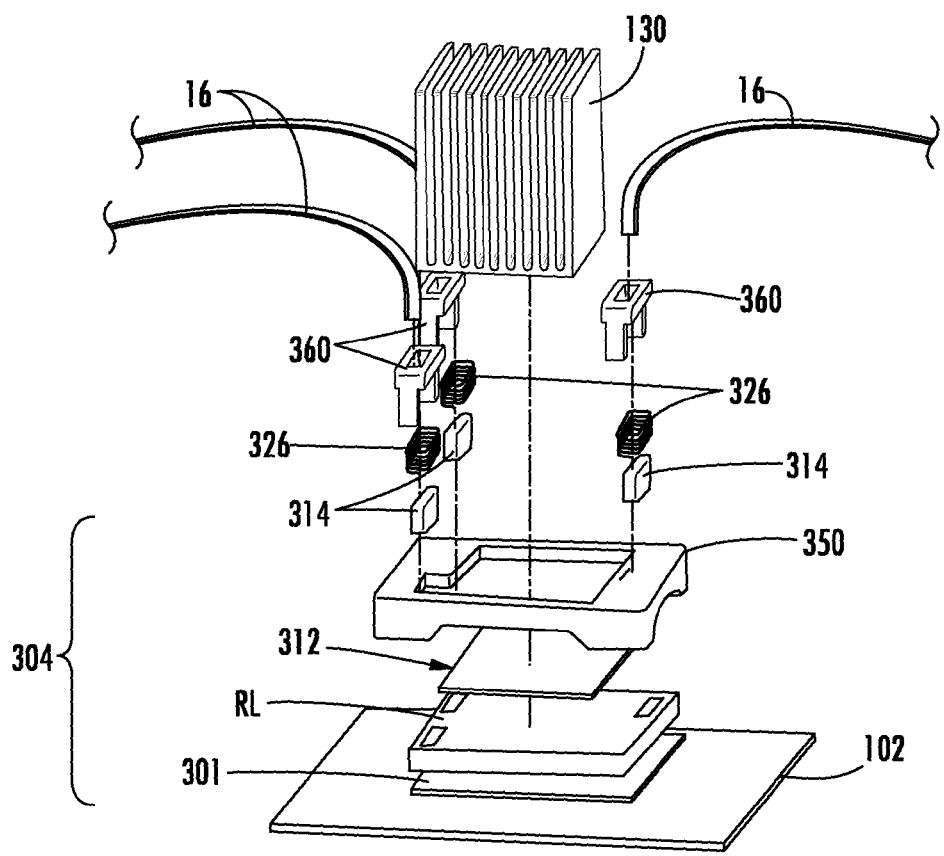
FIG. 27 is an exploded view of the interposer structure and optical assembly of FIG. 26.

FIG. 26 is a perspective view of interposer structure 300 having optical interface OI (FIG. 28) for optical connection with one or more optical assemblies 310 secured to a frame 350 and FIG. 27 is an exploded view of interposer structure 300 and optical assembly 310. Like interposer 204, an interposer 304 includes a silicon material 301 and a resist layer RL that is formed on the silicon material 301 and FIG. 27 shows the exploded view of the interposer 304. The optical alignment structure is formed in the resist layer RL using a LIGA manufacturing process as discussed herein. By way of example, an integrated circuit 312 is attached to the interposer 204 for optical communication therewith and the interposer 204 may be attached to circuit board 102 and may include communication links therebetween such as discussed herein; however, the IC may be integrated with the interposer as desired. In this embodiment, optical assemblies 310 include a ferrule 314, a resilient member 326 and an attach portion 360.

Figure 28:
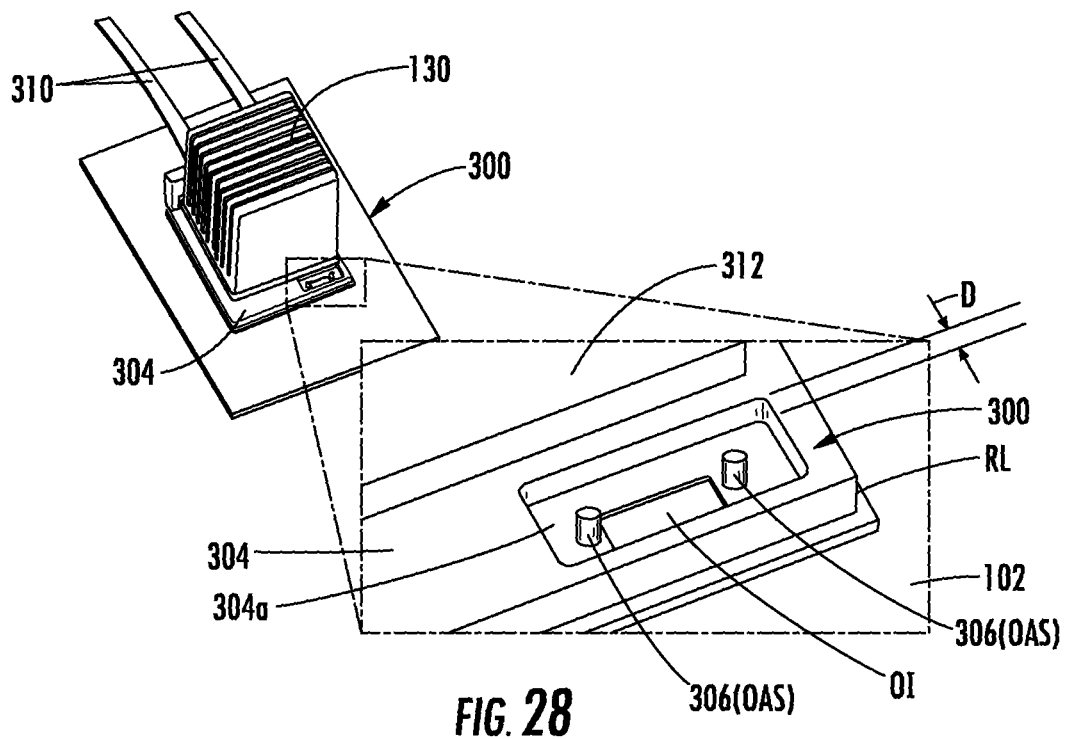
FIG. 28 is a perspective view of the interposer structure of FIGS. 26 and 27 with one of the optical assemblies removed to show the optical interface and the connector mounting surface of the interposer structure.

FIG. 28 is a perspective view of the interposer structure of FIGS. 26 and 27 with one of the optical assemblies 310 removed to reveal the optical interface OI and optical alignment structure. Like interposer 204, interposer 304 has the optical alignment structure formed by a resist layer RL. Specifically, the optical alignment structure includes a connector mounting surface 304a in the interposer 304 is formed by the resist layer RL. Additionally, the resist layer RL of this embodiment also includes one or more protrusions formed as one or more alignment pins 306 in this embodiment. As shown, the connector mounting surface 304a is recessed from a planar surface of the interposer 304 by depth D. Depth D may be any suitable value depending on the desired optical alignment structure used. By way of example, depth D may have a relatively deep depth in this embodiment such between 50-150 microns; but other depths D are possible such as up to 200 microns or more depending on the particular structure used for optical alignment. Recessing the connector mounting surface 304a forms a pocket for receiving ferrule 314 and provides gross alignment. During the formation of the recessed connector mounting surface 304a, alignment pins 306 are also formed in the resist layer RL. In this embodiment, the optical interface OI is disposed between first pin 306 and second pin 306. Alignment pins 306 are integrally formed as a portion of the interposer 304 and may have any suitable shape for cooperating with ferrule 314 for providing fine alignment with the optical interface OI for the optical interconnection. The alignment pins 306 may have a slight taper for controlling optical alignment when mating with one or more alignment bores of ferrule 314, but any suitable shape is possible for the alignment pins. By way of example, alignment pins 306 may have 0.1 micron taper per 100 micron height, but other values for a taper are possible or no taper at all. Moreover, the alignment pins and alignment bores may have a slight interference fit if desired.

Figure 29:
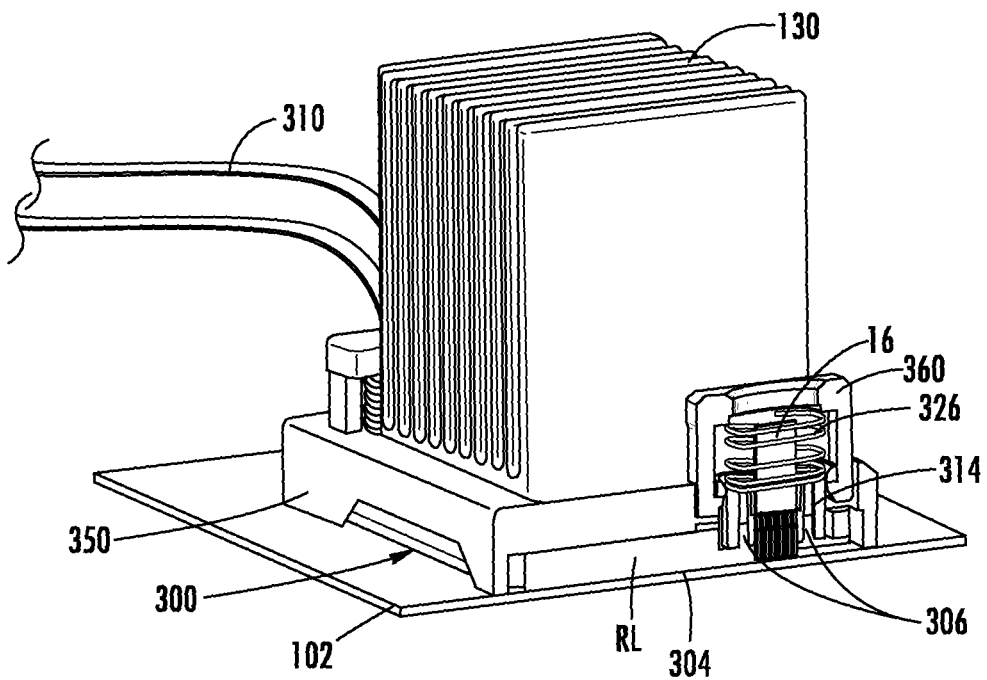
FIGS. 29 and 30 are cross-sectional views of the optical connection between the interposer structure and optical assembly of FIG. 26.
Figure 30:
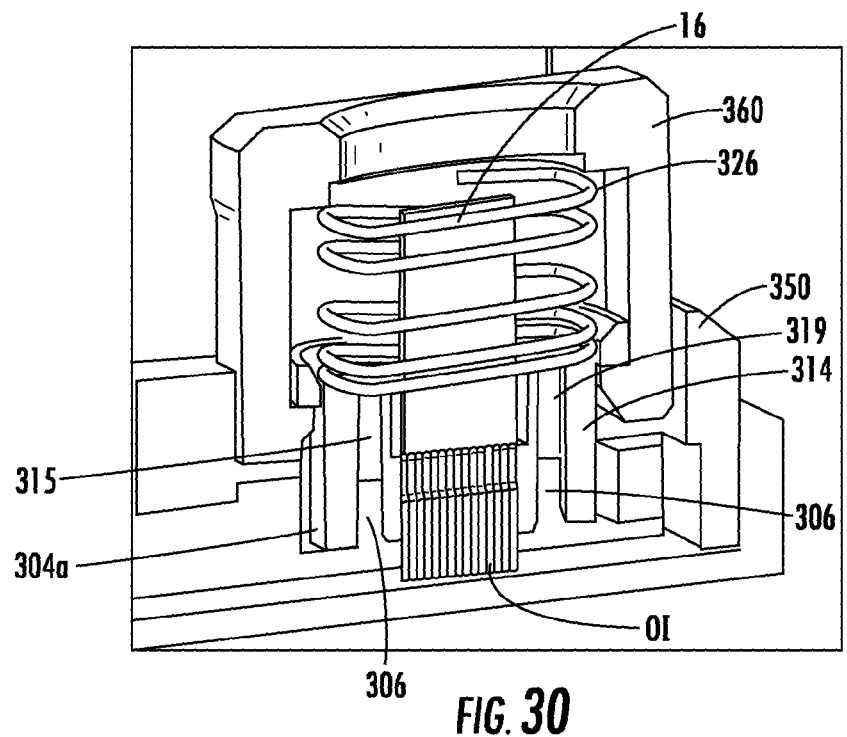

FIGS. 29 and 30 are cross-sectional views showing details of the optical connection between the interposer structure 300 and optical assembly 310. Like ferrule 14, ferrule 314 includes a body having a front end and a rear end with fiber openings for receiving optical fibers 16. Also ferrule 314 include a first alignment bore 315 and a second alignment bore 319 (FIG. 30) for cooperating with alignment pins 306 when mated. In this embodiment, ferrule 314 is biased toward the optical interface OI using resilient member 326 such as a coil spring. Frame 350 has openings (not numbered) that fit about the respective ferrules 314 and then attach portion 360 is slid down the optical fibers 16 for engaging frame 350 and securing the ferrule 314 to the optical interface OI. As depicted, the ferrule 314 is held in position by attach portion 360 being secured to frame 350. Attach portion 360 includes resilient arms (not numbered) having latches (not numbered) that snap-fit to a portion of frame 350.

Figure 31:
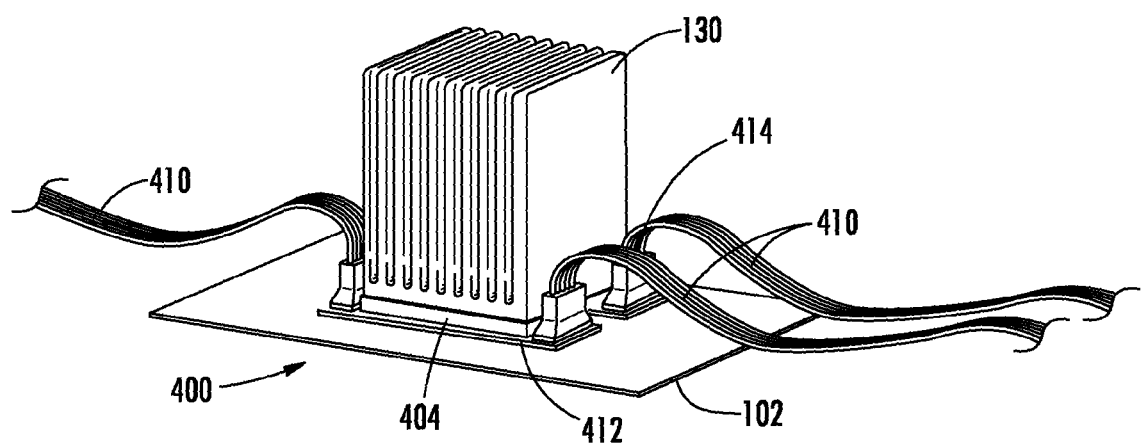
FIG. 31 is a perspective view of yet another interposer structure having an optical interface for optical connection with one or more optical assemblies according to the concepts disclosed herein.
Figure 32:
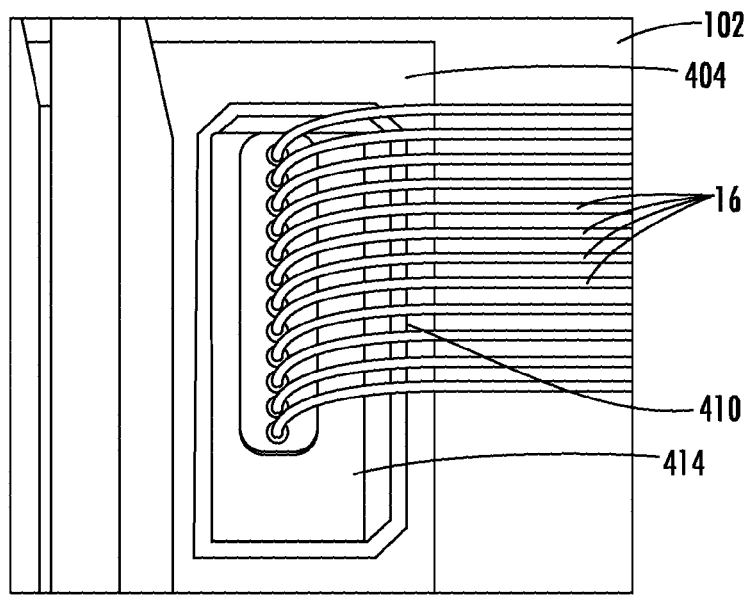
FIG. 32 is a partial top view of the interposer structure and optical assembly of FIG. 31.
Figure 33:
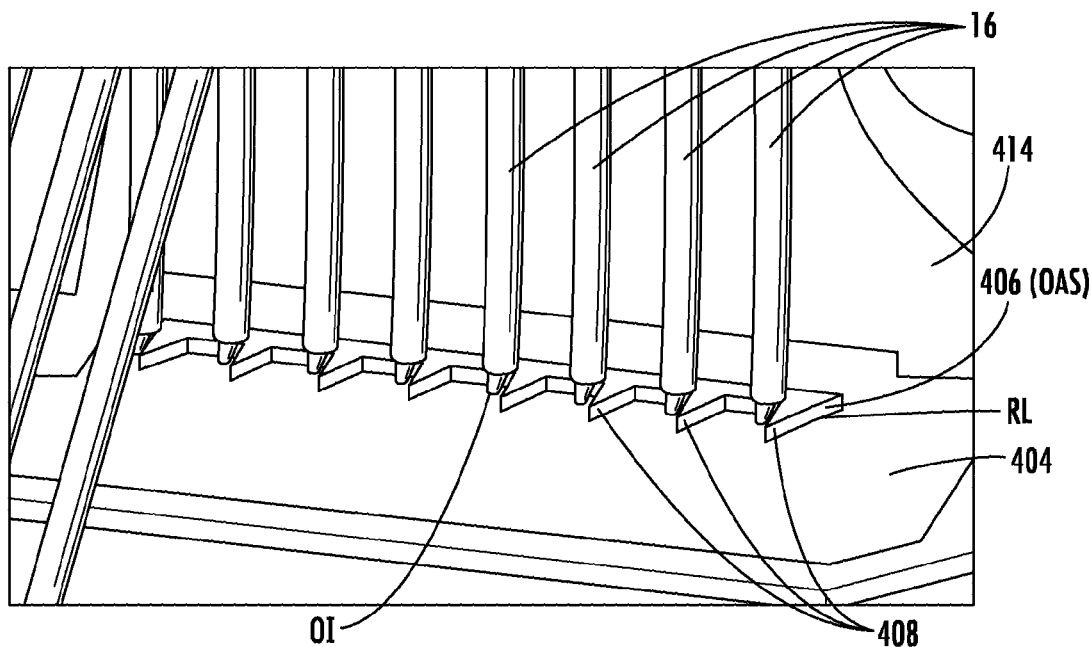
FIG. 33 is a partial cross-sectional view of the optical connection between the interposer structure and optical assembly of FIGS. 31 and 32.

Still other optical alignment structures formed in the resist layer of the interposer are possible for optical alignment with optical fibers of an optical assembly. By way of example, FIGS. 31-33 depict another concept for forming optical alignment structure in the resist layer of the interposer. In this embodiment, the optical alignment structure (e.g., optical alignment features) in the resist layer of the interposer has a connector mounting surface that is recessed from the planar surface of the interposer and also includes one or more protrusions formed from the resist layer. Specifically, the optical alignment structure is one or more protrusions configured as an optical rake 406 for aligning individual optical fibers 16 in between tines 408 of the rake 406 for alignment with the optical interface OI of the interposer 404, but still other protrusion structures are possible using the resist layer. By way of example, an integrated circuit 412 is attached to the interposer 404 for optical communication therewith and the interposer 404 may be attached to circuit board 102 and may include communication links therebetween such as discussed herein, but the IC may be integrated with the interposer according the concepts disclosed as desired.

FIG. 31 is a perspective view of interposer structure 400 having an optical interface OI for optical connection with one or more optical assemblies 410 and FIG. 32 is a partial top view of the interposer structure 400 with optical assembly 410 attached. As shown in FIG. 33, the optical alignment structure in the resist layer RL of the interposer 404 has a connector mounting surface that is recessed from the planar surface of the interposer for gross alignment of the ferrule 414, and also includes one or more protrusions formed from the resist layer. Specifically, the one or more protrusions in this embodiment are configured as an optical rake 408 integrally formed as a portion of the interposer 404. In other words, the individual optical fibers 16 are biased between the tines 408 of the optical rake 406, thereby aligning each optical fiber 16 to a respective pathway of the optical interface OI of interposer 404.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An interposer having a connector mounting surface, an optical alignment structure and an optical interface, the optical alignment structure being formed by a resist layer of the interposer.

2. The interposer of claim 1, wherein the optical alignment structure includes one or more optical fiber alignment features for aligning one or more optical fibers to the optical interface.

3. The interposer of claim 1, the connector mounting surface being recessed from a planar surface of the interposer.

4. The interposer of claim 3, wherein the connector mounting surface has a U-shape.

5. The interposer of claim 1, wherein the optical alignment structure is disposed on the planar surface of the interposer.

6. The interposer of claim 1, the interposer being at least partially formed from silicon.

7. The interposer of claim 1, the interposer having an optical assembly attached to the connector mounting surface.

8. The interposer of claim 1, wherein the interposer is formed from a material with a first coefficient of thermal expansion (CTE) and a ferrule of the optical assembly is formed from a material with a second CTE, and the CTE delta between the interposer and the ferrule is 4.0×10−6° C. (Δmm/mm) or less at ambient conditions.

9. A method of making an interposer, comprising:
forming an interposer on a silicon material so it has a connector mounting surface with an optical interface; and
forming an optical alignment feature in the interposer that is disposed adjacent to the connector mounting surface; wherein the optical alignment feature is formed in a resist layer of the interposer.

10. The method of claim 9, wherein the connector mounting surface is formed as recessed portion from a planar surface of the interposer.

11. The method of claim 9, wherein the optical alignment feature has one or more optical fiber alignment features.

12. The method of claim 11, wherein the one or more optical fiber alignment features is a fiber rake.

13. An interposer having a connector mounting surface, an optical alignment structure and an optical interface, the optical alignment structure being formed by a resist layer of the interposer, and the connector mounting surface being recessed from a planar surface of the interposer.

14. The interposer of claim 13, wherein the optical alignment structure includes one or more optical fiber alignment features for aligning one or more optical fibers to the optical interface.

15. The interposer of claim 13, wherein the optical alignment structure is disposed on the planar surface of the interposer.

16. The interposer of claim 13, the interposer being at least partially formed from silicon.

17. The interposer of claim 13, the interposer having an optical assembly attached to the connector mounting surface.

18. The interposer of claim 13, wherein the interposer is formed from a material with a first coefficient of thermal expansion (CTE) and a ferrule of the optical assembly is formed from a material with a second CTE, and the CTE delta between the interposer and the ferrule is $4.0 \times 10^{-6}$° C. ($\Delta$mm/mm) or less at ambient conditions.

\* \* \* \* \*